United States Patent
Dutta et al.

(10) Patent No.: US 12,363,773 B2
(45) Date of Patent: Jul. 15, 2025

(54) SIGNALING SCHEMES FOR ASSISTED COMMUNICATIONS BETWEEN WIRELESS DEVICES

(71) Applicant: QUALCOMM INCORPORATED, San Diego, CA (US)

(72) Inventors: Sourjya Dutta, San Diego, CA (US); Navid Abedini, Basking Ridge, NJ (US); Kapil Gulati, Belle Mead, NJ (US); Junyi Li, Fairless Hills, PA (US); Shuanshuan Wu, San Diego, CA (US); Anantharaman Balasubramanian, San Diego, CA (US); Preeti Kumari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 713 days.

(21) Appl. No.: 17/453,625

(22) Filed: Nov. 4, 2021

(65) Prior Publication Data

US 2023/0133803 A1    May 4, 2023

(51) Int. Cl.
*H04W 8/00*    (2009.01)
*H04B 7/155*   (2006.01)
(Continued)

(52) U.S. Cl.
CPC ............ *H04W 76/14* (2018.02); *H04B 7/155* (2013.01); *H04W 8/005* (2013.01)

(58) Field of Classification Search
CPC ... H04W 76/12; H04W 64/003; H04W 40/22; H04W 92/18; H04W 76/14; H04W 40/12;
(Continued)

(56) References Cited

U.S. PATENT DOCUMENTS 10,182,391 B2 *  1/2019  Suzuki ................... H04W 24/04
10,687,198 B2 *  6/2020  Ryu ....................... H04W 88/04
(Continued)

FOREIGN PATENT DOCUMENTS

WO    WO-2016164808 A1    10/2016
WO    WO-2021162506 A1     8/2021

OTHER PUBLICATIONS

3GPP TR 23.703, "3rd Generation Partnership Project; Technical Specification Group Services and System Aspects; Study on Architecture Enhancements to Support Proximity-based Services (ProSe) (Release 12)", 3GPP TR 23.703, V0.8.0, 3rd Generation Partnership Project, Mobile Competence Centre, 650, Route Des Lucioles, F-06921 Sophia-Antipolis Cedex, France, vol. SA WG2, No. V0.8.0, Nov. 26, 2013, pp. 1-208, XP050728656, Paragraph [6.3.5]-[6.3.13].

(Continued)

*Primary Examiner* — Edan Orgad
*Assistant Examiner* — Vanneilian Lalchinthang
(74) *Attorney, Agent, or Firm* — Paul M. McAdams; Holland & Hart LLP

(57) ABSTRACT

Methods, systems, and devices for wireless communications are described. The method may include a first wireless device transmitting, to a third wireless device associated with a signal relaying device, a first message querying whether the third wireless device is able to establish a first communications link with a second wireless device. The first wireless device may receive, from the third wireless device, signaling indicative of whether the third wireless device is able to establish the first communications link with the second wireless device and communicate with the second wireless device via a second communications link using a signal relaying device of the one or more signal relaying (Continued)

devices associated with the third wireless device based on the signaling.

30 Claims, 15 Drawing Sheets

(51) Int. Cl.
*H04W 40/22* (2009.01)
*H04W 76/11* (2018.01)
*H04W 76/14* (2018.01)

(58) Field of Classification Search
CPC ..... H04W 76/11; H04W 76/18; H04W 8/005; H04W 88/04; H04W 24/10; H04B 7/15507; H04B 7/155; H04B 7/0617; H04B 7/15542; H04L 61/103; H04L 61/5007
USPC .......................................................... 370/315
See application file for complete search history.

(56) References Cited

U.S. PATENT DOCUMENTS

| | | | |
|---|---|---|---|
| 2015/0172846 A1* | 6/2015 | Ge | H04W 8/005 370/254 |
| 2017/0273124 A1* | 9/2017 | Yang | H04M 3/42059 |
| 2018/0092017 A1* | 3/2018 | Freda | H04W 76/23 |
| 2018/0249461 A1* | 8/2018 | Miao | H04W 72/27 |
| 2020/0154347 A1* | 5/2020 | Abouelseoud | H04W 8/005 |
| 2020/0195321 A1* | 6/2020 | Black | H04B 7/0408 |
| 2022/0279586 A1* | 9/2022 | Tsuboi | H04W 36/08 |
| 2023/0079552 A1* | 3/2023 | Back | H04W 40/20 370/315 |
| 2023/0209618 A1* | 6/2023 | Fu | H04L 61/5092 370/329 |
| 2023/0217301 A1* | 7/2023 | Lee | H04W 76/14 370/310 |
| 2023/0224987 A1* | 7/2023 | Kim | H04W 92/18 370/315 |
| 2023/0269705 A1* | 8/2023 | Park | H04W 72/563 370/329 |

OTHER PUBLICATIONS

3GPP TR 23.713, "3rd Generation Partnership Project; Technical Specification Group Services and System Aspects; Study on Extended Architecture Support for Proximity-based Services (Release 13)", 3GPP TR 23.713, V1.5.0, 3rd Generation Partnership Project, Mobile Competence Centre, 650, Route Des Lucioles, F-06921 Sophia-Antipolis Cedex, France, vol. SA, WG2, No. V1.5.0, Jul. 28, 2015, pp. 1-83, XP050995819, Para 5.1.2.6-5.4.3, 6.1.2-7.5.4.
International Search Report and Written Opinion—PCT/US2022/048458—ISA/EPO—Feb. 27, 2023 (2105616WO).

\* cited by examiner

SIGNALING SCHEMES FOR ASSISTED COMMUNICATIONS BETWEEN WIRELESS DEVICES

FIELD OF TECHNOLOGY

The following relates to wireless communications, including signaling schemes for assisted communications between wireless devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support signaling schemes for assisted communications between wireless devices. Generally, the described techniques provide for a first node to utilize information associated with a link between a second node and an assisting node (e.g., a third node) to establish an assisted communications link for communication with the second node, where the assisted communications link is via an assisting device controlled by the assisting node. In some examples, the first node may transmit a first message to one or more assisting nodes querying whether the one or assisting nodes are themselves capable of establishing a link with the second node. An assisting node may determine information related to the second node (e.g., signal quality measurements of signals from the second node) and transmit, to the first node, signaling indicative of whether the assisting nodes is capable of establishing a link with the second node. The first node may select an assisting node from the one or more assisting nodes based on the signaling, and the first node may subsequently communicate with the second node using an assisted communications link that includes (e.g., is facilitated by) an assisting device associated with (e.g., controlled by) the selected assisting node.

An assisting device may be a signal relaying device (e.g., a relay, a repeater, a reconfigurable intelligent surface (RIS), or a metasurface). Whether an assisting node is able to establish a link with the second node may be indicative, for example, of whether an assisting device that is associated with (e.g., controlled by) the assisting node is suitable for supporting communications between the first node and the second node. Techniques as described herein may reduce signaling involved in establishing an assisted communications link (e.g., a communications link between a first node and a second node in which signaling is routed via an assisting device) when compared to other approaches, among other potential benefits.

A method for wireless communications at a first wireless device is described. The method may include transmitting, to a third wireless device associated with one or more signal relaying devices, a first message querying whether the third wireless device is able to establish a first communications link with a second wireless device, the first message including an identity of the second wireless device, receiving, from the third wireless device, signaling indicative of whether the third wireless device is able to establish the first communications link with the second wireless device, and communicating, based on the signaling indicating that the third wireless device is able to establish the first communications link, with the second wireless device via a second communications link using a signal relaying device of the one or more signal relaying devices associated with the third wireless device.

An apparatus for wireless communications at a first wireless device is described. The apparatus may include a processor, memory coupled with the processor, and instructions stored in the memory. The instructions may be executable by the processor to cause the apparatus to transmit, to a third wireless device associated with one or more signal relaying devices, a first message querying whether the third wireless device is able to establish a first communications link with a second wireless device, the first message including an identity of the second wireless device, receive, from the third wireless device, signaling indicative of whether the third wireless device is able to establish the first communications link with the second wireless device, and communicate, based on the signaling indicating that the third wireless device is able to establish the first communications link, with the second wireless device via a second communications link using a signal relaying device of the one or more signal relaying devices associated with the third wireless device.

Another apparatus for wireless communications at a first wireless device is described. The apparatus may include means for transmitting, to a third wireless device associated with one or more signal relaying devices, a first message querying whether the third wireless device is able to establish a first communications link with a second wireless device, the first message including an identity of the second wireless device, means for receiving, from the third wireless device, signaling indicative of whether the third wireless device is able to establish the first communications link with the second wireless device, and means for communicating, based on the signaling indicating that the third wireless device is able to establish the first communications link, with the second wireless device via a second communications link using a signal relaying device of the one or more signal relaying devices associated with the third wireless device.

A non-transitory computer-readable medium storing code for wireless communications at a first wireless device is described. The code may include instructions executable by a processor to transmit, to a third wireless device associated with one or more signal relaying devices, a first message querying whether the third wireless device is able to establish a first communications link with a second wireless device, the first message including an identity of the second wireless device, receive, from the third wireless device, signaling indicative of whether the third wireless device is able to establish the first communications link with the second wireless device, and communicate, based on the signaling indicating that the third wireless device is able to establish the first communications link, with the second wireless device via a second communications link using a signal relaying device of the one or more signal relaying devices associated with the third wireless device.

Some examples of the method, apparatuses, and non-transitory computer-readable medium described herein may further include operations, features, means, or instructions for attempting to communicate with the second wireless device over a direct communications link between the first wireless device and the second wireless device, where transmitting the first message to the third wireless device may be based on failing to communicate with the second wireless device over the direct communications link.

Some examples of the method, apparatuses, and non-transitory computer-readable medium described herein may further include operations, features, means, or instructions for initiating a timer based on transmitting the first message and determining that the third wireless device may be able to establish the first communications link with the second wireless device based on receiving the signaling before an expiration of the timer.

In some examples of the method, apparatuses, and non-transitory computer-readable medium described herein, the first message indicates a value of the timer.

Some examples of the method, apparatuses, and non-transitory computer-readable medium described herein may further include operations, features, means, or instructions for determining to communicate with the second wireless device via the second communications link using the signal relaying device based on first measurement information associated with a first channel between the first wireless device and the third wireless device, second measurement information associated with a second channel between the third wireless device and the second wireless device, or any combination thereof.

Some examples of the method, apparatuses, and non-transitory computer-readable medium described herein may further include operations, features, means, or instructions for transmitting, to the third wireless device, a confirmation message indicating that the first wireless device will communicate with the second wireless device using the signal relaying device controlled by the third wireless device.

In some examples of the method, apparatuses, and non-transitory computer-readable medium described herein, the signaling indicative of whether the third wireless device is able to establish a first communication link with the second wireless device indicates a granted period for use of the signal relaying device by the first wireless device, where the method may further include operations, features, means, or instructions for transmitting one or more signals to the signal relaying device during the granted period and determining, based on least in part on transmitting the one or more signals to the signal relaying device during the granted period, one or more parameters for the communicating with the second wireless device via the second communications link using the signal relaying device.

Some examples of the method, apparatuses, and non-transitory computer-readable medium described herein may further include operations, features, means, or instructions for establishing a radio bearer between the first wireless device and the third wireless device before transmitting the first message, where transmitting the first message includes and transmitting a radio resource control (RRC) message that includes the first message over the radio bearer between the first wireless device and the third wireless device.

In some examples of the method, apparatuses, and non-transitory computer-readable medium described herein, transmitting the first message may include operations, features, means, or instructions for transmitting a broadcast message that includes the first message.

Some examples of the method, apparatuses, and non-transitory computer-readable medium described herein may further include operations, features, means, or instructions for performing, prior to transmitting the first message, a discovery procedure to detect the third wireless device.

Some examples of the method, apparatuses, and non-transitory computer-readable medium described herein may further include operations, features, means, or instructions for receiving, prior to transmitting the first message, a discovery signal from the second wireless device via the signal relaying device controlled by the third wireless device or a second signal relaying device controlled by a fourth wireless device different from the third wireless device.

In some examples of the method, apparatuses, and non-transitory computer-readable medium described herein, the first message further indicates a type of service requested by the first wireless device, a service requested by the first wireless device, a quality of service (QOS) threshold, a cell identifier associated with the first wireless device or the second wireless device, a group identifier associated with the first wireless device or the second wireless device, or any combination thereof.

In some examples of the method, apparatuses, and non-transitory computer-readable medium described herein, the signaling indicative of whether the third wireless device may be able to establish the second communications link with the second wireless device indicates whether the third wireless device detected the second wireless device, an identifier of the second wireless device, identifiers of one or more third wireless devices different from the second wireless device detected by the third wireless device, one or more link quality measurements associated with the second wireless device, whether the second wireless device supports one or more types of services, a location of the second wireless device, a location of the second wireless device in relation to the third wireless device, a quantity of available configurations for the signal relaying device, or any combination thereof.

In some examples of the method, apparatuses, and non-transitory computer-readable medium described herein, the signal relaying device includes a relay, a repeater, a RIS, a metasurface, or any combination thereof and the third wireless device includes a controller for the signal relaying device.

A method for wireless communications at a third wireless device is described. The method may include receiving, from a first wireless device, a first message querying whether the third wireless device is able to establish a communications link with a second wireless device, the first message including an identity of the second wireless device, transmitting, to the first wireless device based on attempting to establish the communications link, signaling indicative of whether the third wireless device is able to establish the communications link with the second wireless device, and receiving, from the first wireless device and based on the signaling, an indication of whether the first wireless device will communicate with the second wireless device using a signal relaying device controlled by the third wireless device.

An apparatus for wireless communications at a third wireless device is described. The apparatus may include a processor, memory coupled with the processor, and instructions stored in the memory. The instructions may be executable by the processor to cause the apparatus to receive, from a first wireless device, a first message querying whether the third wireless device is able to establish a communications link with a second wireless device, the first message including an identity of the second wireless device, transmit, to the first wireless device based on attempting to establish the communications link, signaling indicative of whether the third wireless device is able to establish the communications link with the second wireless device, and receive, from the first wireless device and based on the signaling, an indication of whether the first wireless device will communicate with the second wireless device using a signal relaying device controlled by the third wireless device.

Another apparatus for wireless communications at a third wireless device is described. The apparatus may include means for receiving, from a first wireless device, a first message querying whether the third wireless device is able to establish a communications link with a second wireless device, the first message including an identity of the second wireless device, means for transmitting, to the first wireless device based on attempting to establish the communications link, signaling indicative of whether the third wireless device is able to establish the communications link with the second wireless device, and means for receiving, from the first wireless device and based on the signaling, an indication of whether the first wireless device will communicate with the second wireless device using a signal relaying device controlled by the third wireless device.

A non-transitory computer-readable medium storing code for wireless communications at a third wireless device is described. The code may include instructions executable by a processor to receive, from a first wireless device, a first message querying whether the third wireless device is able to establish a communications link with a second wireless device, the first message including an identity of the second wireless device, transmit, to the first wireless device based on attempting to establish the communications link, signaling indicative of whether the third wireless device is able to establish the communications link with the second wireless device, and receive, from the first wireless device and based on the signaling, an indication of whether the first wireless device will communicate with the second wireless device using a signal relaying device controlled by the third wireless device.

Some examples of the method, apparatuses, and non-transitory computer-readable medium described herein may further include operations, features, means, or instructions for determining, based on receiving the first message, that the third wireless device may be able to establish the communications link with the second wireless device and transmitting, to the second wireless device, a second message indicating a type of service requested by the first wireless device, a service requested by the first wireless device, an application associated with the first wireless device, or any combination thereof.

Some examples of the method, apparatuses, and non-transitory computer-readable medium described herein may further include operations, features, means, or instructions for receiving, from the second wireless device, an indication of whether the second wireless device supports the type of service, the service, the application, or any combination thereof.

In some examples of the method, apparatuses, and non-transitory computer-readable medium described herein, determining that the third wireless device may be able to establish the communications link with the second wireless device may include operations, features, means, or instructions for identifying that the communications link with the second wireless device was already established prior to receiving the first message and establishing the communications link with the second wireless device after receiving the first message.

Some examples of the method, apparatuses, and non-transitory computer-readable medium described herein may further include operations, features, means, or instructions for monitoring for one or more synchronization signals from the second wireless device based on receiving the first message and measuring the one or more synchronization signals to determine one or more link quality measurements associated with the one or more synchronization signals, where the signaling indicative of whether the third wireless device may be able to establish the communications link with the second wireless device indicates the one or more link quality measurements.

Some examples of the method, apparatuses, and non-transitory computer-readable medium described herein may further include operations, features, means, or instructions for transmitting, to the second wireless device and based on receiving the first message, a broadcast message that includes at least a portion of the first message.

In some examples of the method, apparatuses, and non-transitory computer-readable medium described herein, the broadcast message further includes an indication of one or more resources for the second wireless device to use to establish the communications link.

In some examples of the method, apparatuses, and non-transitory computer-readable medium described herein, the signaling indicative of whether the third wireless device may be able to establish the communications link with the second wireless device indicates a granted period for use of the signal relaying device by the first wireless device.

Some examples of the method, apparatuses, and non-transitory computer-readable medium described herein may further include operations, features, means, or instructions for establishing a radio bearer between the third wireless device and the first wireless device before receiving the first message, where receiving the first message includes and receiving a RRC message that includes the first message over the radio bearer between the first wireless device and the third wireless device.

In some examples of the method, apparatuses, and non-transitory computer-readable medium described herein, receiving the first message may include operations, features, means, or instructions for receiving a broadcast message that includes the first message.

In some examples of the method, apparatuses, and non-transitory computer-readable medium described herein, the first message further indicates a type of service requested by the first wireless device, a service requested by the first wireless device, a QoS threshold, a cell identifier associated with the first wireless device or the second wireless device, a group identifier associated with the first wireless device or the second wireless device, or any combination thereof.

In some examples of the method, apparatuses, and non-transitory computer-readable medium described herein, the signaling indicative of whether the third wireless device may be able to establish the communications link with the second wireless device indicates a value of a timer, whether the third wireless device may have detected the second wireless device, an identifier of the second wireless device, identifiers of one or more additional wireless devices detected by the third wireless device and different from the second wireless device, link quality measurements associated with the second wireless device, an indication of whether the second wireless device supports one or more types of services, a location of the second wireless device, a location of the second wireless device relative to the third wireless device, a quantity of available configurations for the signal relaying device, or any combination thereof.

In some examples of the method, apparatuses, and non-transitory computer-readable medium described herein, the signal relaying device includes a relay, a repeater, a RIS, a metasurface, or any combination thereof and the third wireless device includes a controller for the signal relaying device.

DETAILED DESCRIPTION

Figure 1:
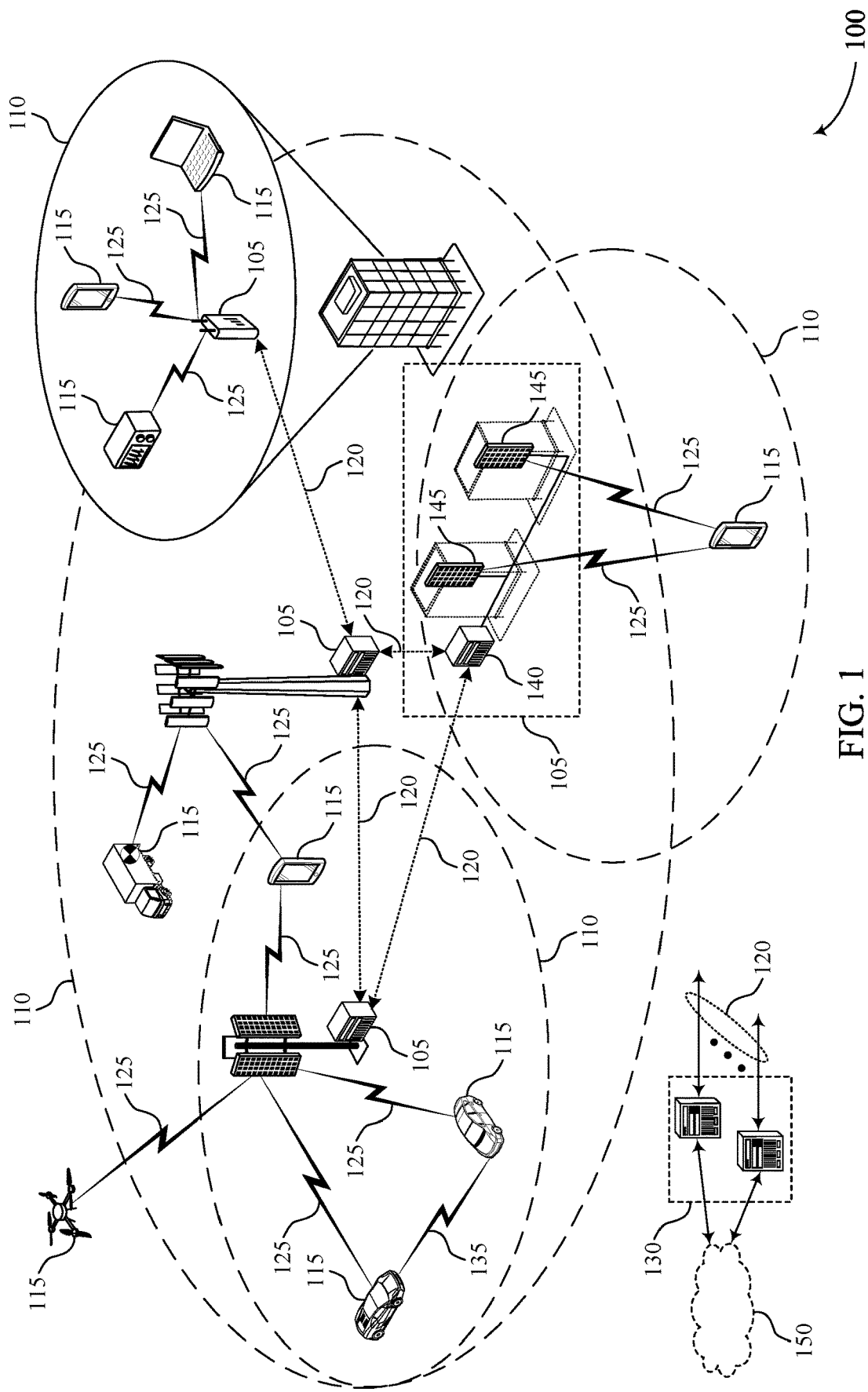
FIGS. 1 and 2 illustrate examples of a wireless communications system that supports signaling schemes for assisted communications between wireless devices in accordance with aspects of the present disclosure.

In some examples, a direct link between a first wireless device and a second wireless device may be blocked (e.g., be associated with undesirably poor signal quality). In such cases, the first wireless device may coordinate with one or more assisting nodes (e.g., third wireless devices) to identify an assisting device that may facilitate communications between the first wireless device and the second wireless device. An assisting device, which may alternatively be referred to as a signal relaying device, may be any device capable of steering (e.g., rerouting, via reflection, refraction, retransmission, or any combination thereof), to the second wireless device, a signal that is transmitted to the assisting device from the first wireless device, such that the signal from the first wireless device reaches the second wireless device due to the steering thereof by the assisting device. Examples of assisting devices may include relays, repeaters, reconfigurable intelligent surfaces (RISs), metasurfaces, or any combination thereof.

An assisting node may refer to a wireless device that controls one or more assisting devices and is capable of communicating directly with other wireless devices (e.g., capable of communicating directly with user equipments (UEs) or base stations). For example, an assisting node may control the configuration of a RIS, and the assisting node may be able to communicate directly with a first UE and a second UE to support the establishment of an assisted wireless communications link between the first UE and the second UE via the RIS (e.g., an indirect communications link in which signaling passes from the first UE to the RIS to the second UE).

When a first wireless device senses that a direct link with a second wireless device is not suitable for communications (e.g., is blocked or otherwise associated with low signal quality), the first wireless device may detect one or more assisting nodes and transmit multiple discovery signals to the second wireless device via one or more assisting devices associated with the one or more assisting nodes, where each of the multiple discovery signals is associated with a different assisting device configuration. The second wireless device may decode one or more of the multiple discovery signals and transmit a discovery reply message to the first wireless device. The discovery reply message may indicate the decoded discovery signals and measurement information associated with the discovery signals. Based on the discovery reply message, the first wireless device may select an assisting node and corresponding assisting device configuration to use to communicate with the second wireless device (e.g., via an assisted communications link supported by a selected assisting device).

In some examples, the forward link (e.g., assisted communications link used to transmit a signal from the first wireless device to the second wireless device) and the reverse link (e.g., assisted communications link used to transit a signal from the second wireless device to the first wireless device) may not be reciprocal. As such, the second wireless device may undergo a similar procedure as the first wireless device to discover a suitable assisting node and corresponding assisting configuration to communicate with the first wireless device over the reverse link.

In some wireless communications system, because the first wireless device or the second wireless device does not initially have knowledge of which assisting node or assisting device to use for the assisted communications links, the first wireless device or the second wireless device must test each assisting node and associated assisting device using multiple discovery signals, which may introduce latency into the wireless communication system. In addition, this excess signaling may waste valuable resources.

In some examples described herein, the first wireless device may transmit a first message to one or more assisting nodes, which may in some cases be referred to as discovery assistance message. The first message may include one or more of the identity of the second wireless device, a type of service supported by the first wireless device, a quality of service (QOS) threshold, etc. The first message may be transmitted by the first wireless device in a radio resource control (RRC) message to each of one or more assisting nodes or transmitted in a broadcast message or a groupcast message to the one or more assisting nodes. In one example, the one or more assisting nodes may have previously established or may subsequently attempt to establish a wireless communications link (e.g., a direct link) with the second wireless device. If a link is established between the one or more assisting nodes and the second wireless device, the one or more assisting nodes may gather information from the second wireless device (e.g., an indication of whether the type of service supported by the first wireless device is supported by the second wireless device). In some examples, the assisting node may broadcast a second message to the second wireless device, where the second message includes at least a portion of the first message, and the second wireless device may subsequently establish a link with the assisting node based on the second message.

After having established or having attempted to establish a link with the second wireless device, an assisting nodes may transmit signaling to the first device indicating the ability of the assisting node to form a link with the second wireless device. Such signaling may in some cases be referred to as a discovery assistance reply message. The signaling may include an indication of whether the second wireless device was detected by the assisting node, and in some cases the signaling may include one or more link quality measurements associated with the channel between the assisting node and the second wireless device.

Upon receiving such signaling from one or more assisting nodes, the first wireless device may select an assisting node from the one or more assisting nodes based on the signaling and further based on measurement information associated with one or more channels between the first wireless device and the one or more assisting nodes. After selecting an assisting node, the first wireless device may communicate with the second wireless device via one or more assisting devices of the selected assisting node. Thus, whether an assisting node is able to establish a communications link with the second wireless device may be a factor in whether the assisting node (and hence whether an assisting device associated with the assisting node) is selected. For example, whether an assisting node is able to establish a communications link with the second wireless device may serve as a proxy for the suitability (or lack thereof) of an associated assisting device for establishing an assisted communications link between the first wireless device and the second wireless device. In some examples, the second wireless device may undergo a similar procedure to determine an appropriate assisting device to use to communicate with the first wireless device. Techniques as described herein may allow a first wireless device to select an assisting node prior to transmitting the multiple discovery signals to the second wireless device, which may reduce signaling and latency when compared to other techniques, among other possible advantages.

Aspects of the disclosure are initially described in the context of wireless communications systems. Additional aspects of the disclosure are described in the context of a process flow Aspects of the disclosure are further illustrated by and described with reference to apparatus diagrams, system diagrams, and flowcharts that relate to signaling schemes for assisted communications between wireless devices.

FIG. 1 illustrates an example of a wireless communications system 100 that supports signaling schemes for assisted communications between wireless devices in accordance with aspects of the present disclosure. The wireless communications system 100 may include one or more base stations 105, one or more user equipment (UEs) 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and Ne may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, the wireless communications system 100 may include one or more assisting devices. An assisting device may be controlled by an assisting node and may allow two wireless devices (e.g., UEs 115 or base stations 105) to communicate with one another in scenarios where a direct link between the two wireless devices is blocked. The assisting device may be a relay, a repeater, a RIS, a metasurface, or another kind of signal relaying device. A repeater may be described as an electronic device that receives a signal over a specific frequency, amplifies the signal, and then retransmits it. A relay may be similar to a repeater, but unlike a repeater, a relay may decode and re-encode the received signal before retransmitting it, possibly with some additional processing (e.g., error correction, channel coding) performed on the received signal after the decoding and before the re-encoding. A RIS may be a low power device that can reflect, refract, or otherwise passively steer signals in a desired direction, but may not actively decode, encode, amplify, or otherwise process signals that are reflected. A metasurface may be or include a material with a sub-wavelength thickness, which may impact the amplitude, the phase, or both of an incident signal and thereby influence a direction of subsequent propagation for the signal.

In some examples, a first node (e.g., the UE 115 or the base station 105) may utilize information associated with a link between a second node (e.g., the UE 115 or the base station 105) and an assisting node (e.g., the UE 115 or the base station 105) to establish an assisted communications link for communication with the second node. In some examples, the first node may transmit a first message to one or more assisting nodes querying whether the one or assisting nodes are capable of establishing a link with the second node. The one or more assisting nodes may determine information related to the second node (e.g., signal strength measurements of signals from the second node) and transmit signaling indicative of whether the one or more assisting nodes are capable of establishing the link with the second node. The first node may select an assisting node based on the signaling and communicate with the second node using a signaling path created by an assisting device of the selected assisting node. The methods as described herein may reduce signaling involved in establishing an assisted connection between two wireless devices when compared to traditional methods.

Figure 2:
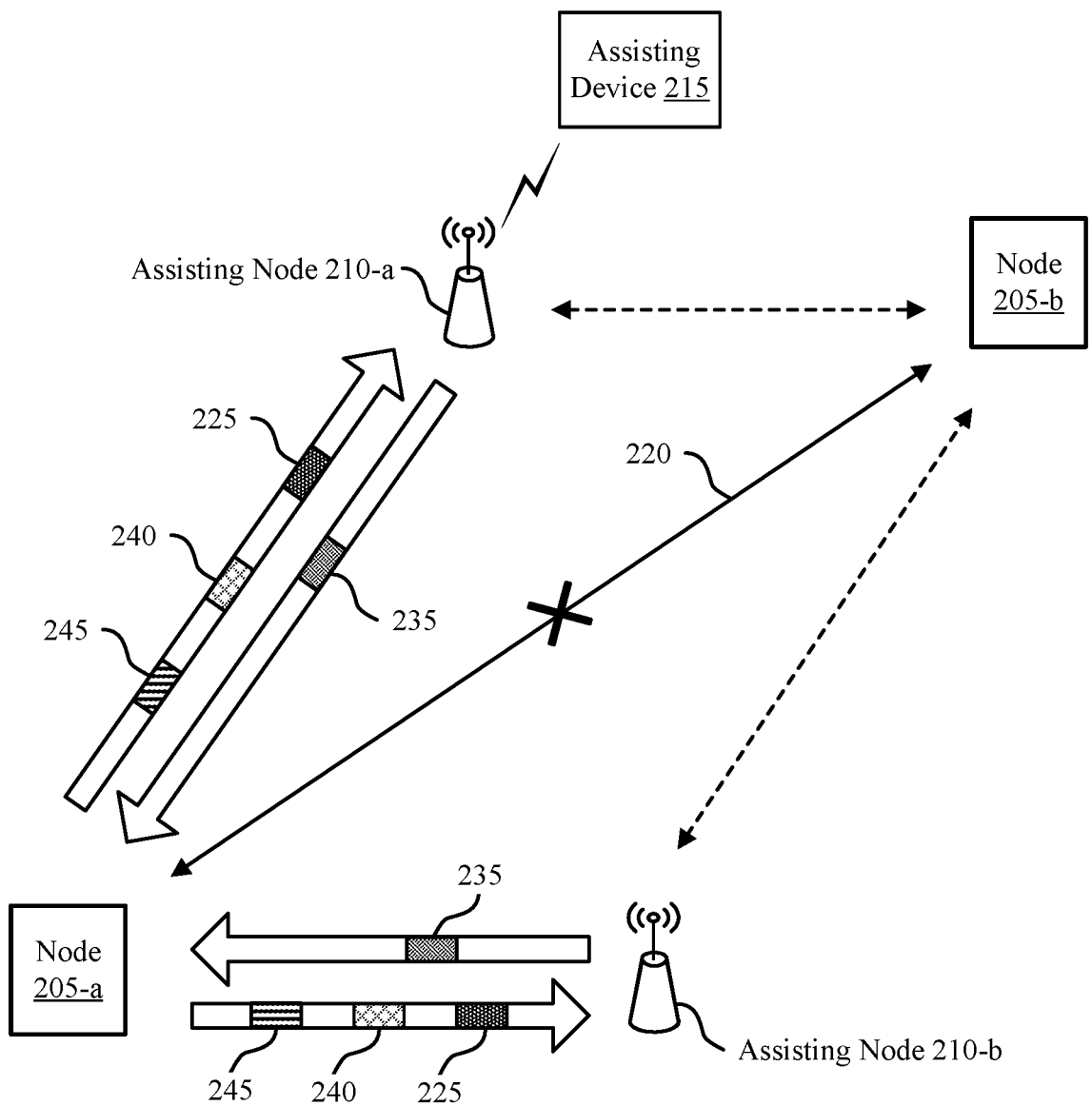

FIG. 2 illustrates an example of a wireless communications system 200 that supports signaling schemes for assisted communications between wireless devices in accordance with aspects of the present disclosure. In some examples, the wireless communications system 200 may implement aspects of a wireless communications system 100. For example, the wireless communications system 200 may include a node 205 (e.g., a node 205-*a* and a node 205-*b*) which may be an example of a base station 105 or a UE 115 as described with reference to FIG. 1.

In some example, the wireless communications system 200 may support assisted communications links. As one example, a node 205-*a* (e.g., a base station, a UE, or any other wireless device) may have pending data to transmit to the node 205-*b* (e.g., a base station, a UE, or any other wireless device). As such, the node 205-*a* and the node 205-*b* may establish a direct link 220 between one another. However, in some cases, the direct link 220 may be blocked (e.g., by buildings or other environment factors) and the node 205-*a* may be unable to transmit the data to the node 205-*b*. In such scenario, the node 205-*a* may utilize an assisting device 215 to communicate with the node 205-*b*.

An assisting device 215 may be an example of a signal relaying device as described herein (e.g., a relay, a repeater, a RIS, a metasurface, or any combination thereof). The assisting device 215 may create a signaling path from the node 205-*a* to the node 205-*b*. In one example, the assisting device 215 may boost (or increase) a signal strength of a signal transmitted from the node-a to the node 205-*b*. In another example, the assisting device 215 may redirect (or steer) the signal transmitted from the node 205-*a* around the blockage to the node 205-*b*. One or more assisting device 215 may be controlled by an assisting node 210. Specifically, the assisting node 210 may control the configuration of the one or more assisting devices 215. The configuration may indicate to the assisting device 215 on how to act. As one example, the configuration may indicate how much to boost (or increase) the signal strength of the signal transmitted from the node 205-*a* to the node 205-*b* or the direction in which to redirect the signal transmitted from the node 205-*a* to the node 205-*b*. In some examples, the assisting node 210 may communicate with other communication nodes (e.g., a controller) to determine the configuration of the one or more assisting devices 215. The assisting node 210 may be an example a UE, a base station, a gNB, an access point, or a roadside unit deployed by an operator of the network.

In some examples, the node 205-*a* may be in proximity of multiple assisting nodes 210. In such example, the node 205-*a* may undergo an assisting node discovery procedure to discover the multiple assisting nodes 210. As one example, the node 205-*a* may discover the assisting node 210-*a* and the assisting node 210-*b* using the assisting node discovery procedure. Each assisting node 210 may correspond to (e.g., be in communication with, be in control of) one or more assisting devices 215. In some cases, an assisting node 210 may include one or more corresponding assisting devices 215. An assisting node 210 may support communications (e.g., with other wireless devices, such as node 205-*a* and 205-*b*) independent of the assisting device 215. For example, an assisting node 210 may include one or more transceivers separate from an associated assisting device 215 and may be able to transmit and receive signaling independent of the associated assisting device 215.

Once the node 205-*a* discovers the assisting nodes 210, the node 205-*a* may determine which assisting device 215 of the assisting nodes 210 and corresponding assisting device configuration may provide the best signaling path to the node 205-*b*. To determine this, the node 205-*a* may reserve at least one assisting device 215 of the assisting node 210-*a* and at least one assisting device 215 of the assisting node 210-*b* for a duration and transmit discovery signals via the assisting devices 215 using different assisting device configurations during the duration. As one example, the node 205-*a* may transmit three discovery signals to the node 205-*b* via an assisting device 215 of the assisting node 210-*a*, where each discovery signal is transmitted using a different assisting device configuration. Similarly, the node 205-*a* may transmit three discovery signals to the node 205-*b* via an assisting device 215 of the assisting node 210-*b*, where each discovery signal is transmitted using a different assisting device configuration. In some examples, each discovery signal may include at least one grant. The grant may indicate resources over which the node 205-*b* may transmit one or more discovery reply messages.

The node 205-*b* may attempt to decode the discovery signals from the node 205-*a*. In some examples, the node 205-*b* may not decode all of the discovery signals from the node 205-*a*. For example, the node 205-*b* may decode the third discovery signal transmitted from the node 205-*a* via the assisting device 215 of the assisting node 210-*a* and the second and third discovery signals transmitted from the node 205-*a* via the assisting device 215 of the assisting node 210-*b*. The node 205-*b* may determine information associated with the decodable discovery messages (e.g., signal quality measurements of the decodable discovery messages) and transmit a discovery reply message to the node 205-*a*. In some examples, the discovery reply message may include an indication of the decoded discovery signals and information associated with the decoded discovery messages (e.g., signal quality measurements of the decoded discovery messages). Based on the discovery reply message, the node 205-*a* may select an assisting node 210 and corresponding assisting device configuration for communication with the node 205-*b*. As an example, the node 205-*a* may select the assisting node 210 and the corresponding assisting node configuration based on the signal quality measurements included in the discovery reply message. As one example, the node 205-*a* may determine that the first discovery signal has higher signal quality measurement values when compared to the second and third discovery signals and select the assisting node 210-*a* and corresponding assisting device configuration for communication with the node 205-*b*.

In some examples, the links between the node 205-*a* to node 205-*b* may not be reciprocal (e.g., forward link may not be reciprocal to the reverse link). As such, the node 205-*b* may perform an operation similar to the node 205-*a* to identify a suitable assisting device and assisting device configuration to communicate with the node 205-*a* over the reverse link. But because the node 205-*a* and the node 205-*b* may not have knowledge of which assisting node 210 may be preferable when establishing the assisted communications link, the node 205-*a* and the node 205-*b* may test all candidate assisting nodes 210 when establishing the assisted communications link which may involve a relatively large amount of signaling and introduce latency into the system.

As described herein, an assisting node 210 may attempt to establish a communication link or communicate with a node as an intermediate step to establishing an assisted connection between the node and a different node which may decrease latency in establishing the assisted connection. In some examples, the node 205-*a* may provide a discovery assistance message 225 to the assisting nodes 210 in its proximity (e.g., the assisting node 210-*a* and the assisting node 210-*b*). The purpose of the discovery assistance message 225 may be to query whether the assisting nodes 210 have the capability to establish a communication link with the node 205-*b*. As one example, the discovery assistance message 225 may include one or more of an identifier corresponding to the node 205-*b*, an identifier corresponding to a service supported by the node 205-*a* (e.g., a service desired or request by the node 205-*b*), a type of service supported by the node 205-*a*, a QoS threshold, a cell identifier associated with the node 205-*b* or the node 205-*a*, or a group identifier associated with the node 205-*b* or the node 205-*a*.

In one example, the node 205-*a* may already have an established connection with the assisting node 210-*a* and the assisting node 210-*b*. That is, the node 205-*a* may have previously performed an assisting node discovery procedure to discovery the assisting node 210-*a* and the assisting node 210-*b*. In such case, the node 205-*a* may transmit the discovery assistance message 225 directly to the assisting node 210-*a* and the assisting node 210-*b*. Alternatively, the node 205-*a* may not have the established connection with the assisting node 210-*a* and the assisting node 210-*b*. In such case, the node 205-*a* may initiate the discovery assisting node procedure or wait until a next discovery assisting node procedure period (e.g., if the node 205-*a* is configured with periodic assisting node discovery) and transmit the discovery assistance message 225 directly to the assisting node 210-*a* and the assisting node 210-*b* upon successful completion of the assisting node discovery procedure. If the node 205-*a* is able to establish a connection with the assisting node 210-*a* and the assisting node 210-*b*, the node 205-*a* may transmit the discovery assistance message 225 as an RRC message over an existing signaling radio bearer (SRB) (e.g., an SRB between the assisting node 210-*a* and the node 205-*a* and an SRB between the assisting node 210-*b* and the node 205-*a*). Alternatively, the node 205-*a* may transmit the discovery assistance message 225 in a groupcast message to the assisting node 210-*a* and the assisting node 210-*b*. In another example, the node 205-*a* may not perform a discovery assistance procedure prior to transmitting the discovery assistance message 225. In such case, the node 205-*a* may broadcast the discovery assistance message 225 to the assisting node 210-*a* and the assisting node 210-*b*.

Upon receiving the discovery assistance message 225, the assisting nodes 210 may gather information related to the node 205-*b*. In some example, the assisting nodes 210 may already have an established connection with the node 205-*b*. In another case, the assisting node 210 may not have an established connection with the node 205-*b* and may attempt to establish a connection with the node 205-*b* using a device discovery procedure (e.g., if the node 205-*b* is a UE and the assisting nodes 210 are UEs) or by paging the node 205-*b* (e.g., if the node 205-*b* is a UE and the assisting nodes 210 are base stations). In either case, if a link is established between the assisting nodes 210 and the node 205-*b*, the assisting nodes 210 may transmit signaling to the node 205-*b* that includes at least a portion of the information included in the discovery assistance message 225 (e.g., meta data received from node 205-*a*). For example, the signaling may include the identifier corresponding to a service supported by the node 205-*a* or the type of service supported by the node 205-*a*. In response to the signaling, the node 205-*b* may transmit, to the assisting nodes 210, an indication of whether the node 205-*a* supports the service (e.g., service type or service ID) indicated in the signaling.

In another example, the assisting nodes 210 may not have an established connection with the node 205-*b* and may determine to perform measurements from the node 205-*b*. In such example, the assisting nodes 210 may monitor for synchronization signals from the node 205-*b* (e.g., if the node 205-*b* is a base station and the assisting nodes 210 are base stations) or may monitor for synchronization transmissions from the node 205-*b* (e.g., if the node 205-*b* is a UE as well as a sync source and the assisting nodes 210 are UEs). The assisting nodes 210 may measure the synchronization signals or synchronization transmissions to determine one or more link quality measurements (e.g., reference signal received power (RSRP), reference signal received quality (RSRQ), or signal-to-interference plus noise ratio (SINR)) between the node 205-*b* and the respective assisting node 210. Alternatively, the assisting nodes 210 may not have an established connection with the node 205-*b* and may broadcast a discovery forward message to the node 205-*b*. The discovery forward message may include some or all of the information included in the discovery assistance message 225. Additionally, the discovery forward message may include a granted period that the node 205-*b* may use to establish a connection with the assisting nodes 210. The granted period may be a random access occasion or a device discovery occasion, etc. In some examples, the assisting nodes 210 may transmit the discovery forward message if there are multiple nodes 205-*b* (e.g., a group of nodes 205-*b* that the node 205-*a* is interested in communicating with).

Upon obtaining the information related to the node 205-*b*, the assisting nodes 210 may transmit a discovery assistance reply message 235 to the node 205-*a*. The discovery assistance reply message 235 may include one or more of an indication of whether the node 205-*b* was discovered or detected by the assisting nodes 210, link quality measurements (e.g., RSRP, RSRQ, or SINR measured by the assisting node based on signals received from the node 205-*b*), a service supported at the node 205-*b* (e.g., an identifier of the service or a type of service), position information associated with the node 205-*b* (e.g., distance between the node 205-*b* and a respective assisting node 210, a distance between the node 205-*b* and the node 205-*a*, zone identifier of the node 205-*b*, or a cell identifier of the node 205-*b*), a grant (e.g., a resource grant indicating resources over which the node 205-*a* may use to transmit discover signals to the node 205-*b*), or a quantity of assisting device configurations that may available for assisting devices 215 of a respective assisting node 210.

The node 205-*a* may receive the discovery assistance reply message 235 and select one or more assisting nodes 210. In some examples, transmitting the discovery assistance message 225 may trigger a timer at the node 205-*a*. If the node 205-*a* does not receive a discovery assistance reply message 235 from an assisting node 210 prior to expiration of the timer, the node 205-*a* may not consider the assisting node 210 in the selection. That is, the node 205-*b* may assume that the assisting node 210 is unable to establish a connection with the node 205-*b*. Alternatively, all of the assisting nodes 210 that correspond to discovery assistance reply messages 235 that are received prior to expiration of the timer may be considered in the selection.

The node 205-*a* may select one or more assisting nodes 210 based on one or more of the contents included in the discovery assistance reply message 235 or link quality measurements between the node 205-*a* and the assisting nodes 210. As one example, the node 205-*a* may select the assisting node 210-*a*. In some examples, the node 205-*a* may select more than one assisting node 210. The node 205-*a* may then transmit a discovery assistance decision message 240 to the assisting nodes 210. The discovery assistance decision message 240 may indicate whether the node 205-*a* may utilize the assisting node 210 to communicate with the node 205-*b*. As one example, the node 205-*a* may transmit a discovery assistance decision message 240 to the assisting node 210-*a* indicating the node 205-*a* is going to utilize the assisting node 210-*a* to communicate with the node 205-*b* (e.g., confirm message) and a discovery assistance decision message 240 to the assisting node 210-*b* indicating that the node 205-*a* is not going to utilize the assisting node 210-*b* to communicate with the node 205-*b* (e.g., reject message).

Upon selecting the assisting node 210, the node 205-*a* may undergo a training procedure to determine the assisting device 215 of the selected assisting node 210 and the corresponding assisting device configuration to use to communicate with the node 205-*b*. That is, the node 205-*a* may transmit discovery signals to the node 205-*b* via assisting devices 215 of the selected assisting node 210, where each discovery message is transmitted using a different assisting device configuration. In some examples, the quantity of different assisting device configurations may correspond to quantity of assisting device configurations indicated in the discovery assistance reply message 235. The node 205-*b* may receive the discovery signals from the node 205-*a* and transmit a discovery reply message indicating the decoded discovery signals and information associated with the decoded discovery signals to the node 205-*a* and the node 205-*a* may select the assisting device and corresponding assisting device configuration based on the discovery reply message. The node 205-*a* may then transmit a data message 245 to the node 205-*b* via the selected assisting device and according to the corresponding assisting device configuration. In some examples, the node 205-*b* may perform operations similar to the node 205-*a* (e.g., transmit a discovery assistance message 225 to the assisting nodes 210) to find a suitable assisting node 210 to communicate with the node 205-*a* on the reverse link. In some example, receiving the discovery signals from the node 205-*a* may trigger the node 205-*b* to perform the similar operations. The methods as described herein may reduce the number of candidate assisting nodes that the node 205-*a* may choose from to establish an assisted connection with a node 205-*b* which may reduce signaling when compared to other methods (e.g., methods involving discovery of an assisting device 215 through direct communications with the assisting device 215).

Figure 3:
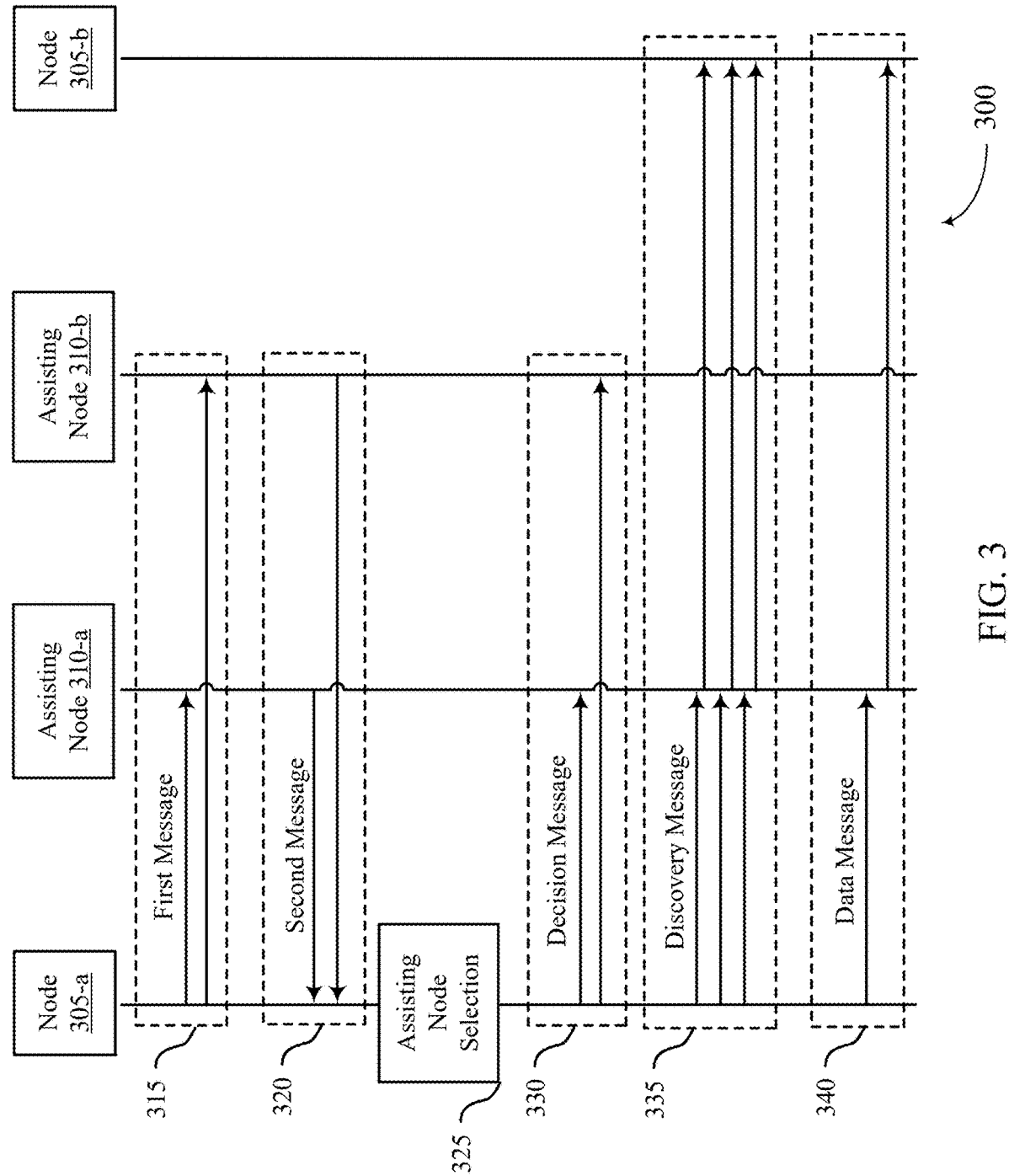
FIG. 3 illustrates an example of a process flow that supports signaling schemes for assisted communications between wireless devices in accordance with aspects of the present disclosure.

FIG. 3 illustrates an example of a process flow 300 that supports signaling schemes for assisted communications between wireless devices in accordance with aspects of the present disclosure. In some examples, the process flow 300 may implement aspects of a wireless communications system 100 and a wireless communications system 200. For example, the process flow 300 may be implemented by nodes 305 (e.g., a node 305-*a* and a node 305-*b*) and assisting nodes 310 (e.g., an assisting node 310-*a* and an assisting node 310-*b*) which may be examples of UEs 115 or base stations 105 as described with reference to FIGS. 1 and 2. Alternative examples of the following may be implemented, where some steps are performed in a different order then described or are not performed at all. In some cases, steps may include additional features not mentioned below, or further steps may be added.

In some examples, the node 305-*a* may attempt to communicate with the node 305-*b* via a direct link between the node 305-*a* and the node 305-*b* and may fail due to some sort of blockage of the direct link (e.g., due to buildings located between the node 305-*a* and the node 305-*b*). In such situation, the node 305-*a* may attempt to communicate with the node 305-*b* via an assisted connection. That is, the node 305-*a* may transmit a signal to the node 305-*b* using a signaling path created by an assisting device. An assisting device may be an example of a repeater, a relay, an intelligent surface, a metasurface, etc. One or more assisting device may be controlled by an assisting node 310. The assisting node 310 may determine a configuration for the one or more assisting device and apply the configuration to the one or more assisting device. The configuration may indicate some parameters to the assisting device. For example, the configuration may indicate an amount of power to boost a signal received from the node 305-*a* such that is reaches the node 305-*b*.

At 315, the node 305-*a* may transmit a first message to the assisting node 310-*a* and the assisting node 310-*b*. The first message may otherwise be known as a discovery assistance message and may include an identifier of the node 305-*b* (or a list of identifiers if there is more than one node that the node 305-*a* is interested in communicating with), a service identifier, a service type, one or more thresholds associated with QoS (e.g., QoS requirements), a cell identifier associated with the node 305-*b* or the node 305-*a*, a group identifier associated with the node 305-*b* or the node 305-*a*, etc. The service identifier or the service type may correspond to a service supported by the node 305-*a* (e.g., a service that the node 305-*a* may utilize to communicate with the node 305-*b*). In some examples, the node 305-*a* may initiate a timer (e.g., $T_{DA}$) in response to transmitting the first message. The timer may designate a duration that a second message (e.g., a reply message to the first message) is expected to be received by the node 305-*a* from the assisting nodes 310. In some examples, the first message may include an indication of the duration of the timer.

In some examples, the node 305-*a* may have previously performed an assisted node discovery procedure and may have established links with the assisting nodes 310. In another example, the node 305-*a* may not have previously performed the assisting node discovery procedure. In such example, the node 305-*a* may initiate the assisting device discovery procedure in order to establish links with the assisting nodes 310 (e.g., upon detecting that a failure has occurred when attempting to communicate with the node 305-*b* over the direct link) or the node 305-*a* may perform the assisting device discovery procedure during a next configured assisting node discovery procedure period in order to establish links with the assisting nodes 310. In either case, if the node 305-*a* is able to establish links with the assisting nodes 310-*a*, the node 305-*a* may transmit the first message to the assisting nodes 310 via an RRC message. The node 305-*a* may establish an SRB with the assisting node 310-*a* and an SRB with the assisting node 310-*a* and transmit the RRC message over respective SRBs to the assisting node 310-*a* and the assisting node 310-*b*.

Alternatively, the node 305-*a* may not have previously performed an assisting node discovery procedure and may not perform an assisting node procedure in response to detecting the failure on the direct link. That is, the node 305-*a* may not establish links with the assisting node 310-*a* and the assisting node 310-*b*. In such case, the node 305-*a* may transmit the first message to the assisting node 310-*a* and the assisting node 310-*b* via a broadcast message.

In some examples, based on the first message, the assisting node 310-*a* and the assisting node 310-*b* may obtain information from at least the node 305-*b*. In one case, the assisting node 310-*a* or the assisting node 310-*b* may determine that it already has an establish link with the node 305-*b*. Alternatively, the assisting node 310-*a* or the assisting node 310-*b* may determine that it does not already have an established link with the node 305-*b* and may attempt to establish a link with the node 305-*b* (e.g., using a device discovery procedure or by paging the node 305-*b*). In either case, if the assisting node 310-*a* or the assisting node 310-*b* is able to establish a connection with the node 305-*b*, the assisting node 310-*a* or the assisting node 310-*b* may transmit signaling to the node 305-*b* over the established link indicating a service identifier or a service type (e.g., service identifier or service type indicated included in the first message), application information, or other meta data received from the node 305-*a* in the first message. In response to the signaling, the node 305-*b* may notify the assisting node 310-*a* or the assisting node 310-*b* whether it can support the services or applications indicated in the signaling.

Alternatively, the assisting node 310-*a* or the assisting node 310-*b* may not have a link established with the node 305-*b* and may not attempt to establish a link with the node 305-*b*. In such case, the assisting node 310-*a* or the assisting node 310-*b* may transmit a discovery forward message to the node 305-*b* in a broadcast message. The discovery forward message may include all or part of the first message. That is, the discovery message may include one or more of the service identifier, the service type, the one or more thresholds associated with QoS, the cell identifier associated with the node 305-*b*, the group identifier associated with the node 305-*b*. Additionally, the discovery forward message may include an indication of an occasion over which that node 305-*b* may attempt to establish a link with the assisting node 310-*a* or the assisting node 310-*b*. The occasion may be a random access channel (RACH) occasion or a device discovery occasion, etc. As such, in response to receiving the discovery forward message, the node 305-*b* may attempt to establish the link with the assisting node 310-*a* or the assisting node 310-*b* during the occasion specified in the discovery forward message.

In another example, the assisting node 310-*a* or the assisting node 310-*b* may perform measurements on signals from the node 305-*b*. As one example, the assisting node 310-*a* or the assisting node 310-*b* may be an example of a UE and the node 305-*b* may be an example of a base station. In such example, the assisting node 310-*a* or the assisting node 310-*b* may attempt to measure synchronization signals from the node 305-*b*. As another example, the assisting node 310-*a* or the assisting node 310-*b* may be an example of a UE and the node 305-*b* may be an example of a UE. In such cases, the assisting node 310-*a* and the assisting node 310-*b* may attempt to synchronization transmissions from the node 305-*b*. The measurements may include RSRP measurements, SINR measurements, or RSRQ measurement of the signals from the node 305-*b*.

At 320, the assisting node 310-*a* and the assisting node 310-*b* may transmit a second message to the node 305-*b*. The second message may otherwise be known as a discovery assistance reply message. In some examples, the second message may include an indication that the node 305-*b* was discovered or detected by the assisting node 310-*a* or the assisting node 310-*b*. For example, the second message may include an identifier associated with the node 305-*b*. If more than one node is discovered or detected by the assisting node 310-*a* or the assisting node 310-*b*, the second message may include a list of identifiers associated with the multiple discovered nodes. Additionally, the second message may include link quality measurements. The link quality measurements may include the RSRP measurements, the SINR measurements, or the RSRQ measurements made by the assisting node 310-*a* or the assisting node 310-*b* based on the signals from the node 305-*b*. In another example, the second message may include an indication of if the node 305-*b* supports the service or applications desired by the node 305-*a* and location information or position information associated with the node 305-*b* relative to the node 305-*a*. Additionally, the second message may include a resource grant. The resource grant may indicate resources that the node 305-*a* may use to establish an assisted connection with the node 305-*b*. That is, resources over which the node 305-*a* may transmit discovery messages to the node 305-*b* using signaling paths created by one or more assisting devices of the assisting node 310-*a* or the assisting node 310-*b*. The second message may also include an indication of a threshold number of assisting device configurations that are available (or required) for use in establishing the assisted connection between the node 305-*a* and the node 305-*b*.

At 325, the node 305-*a* may select an assisting node 310. In some examples, the node 305-*a* may not receive the second message from one or both of the assisting node 310-*a* or the assisting node 310-*b* before expiration of the timer. As one example, the node 305-*b* may not receive the second message from the assisting node 310-*b* before expiration of the timer and may receive the second message from the assisting node 310-*a* before expiration of the timer. Not receiving the second message before expiration of the timer may indicate to the node 305-*a* that the assisting node 310-*b* does not have the ability to establish a link with the node 305-*b*. As such, the assisting node 310-*b* may not be considered in the selection while the assisting node 310-*a* may be considered in the selection. If the node 305-*a* does not receive a second message from both of the assisting node 310-*a* and the assisting node 310-*b* before expiration of the timer, the node 305-*a* may initiate a discovery procedure in an attempt to find another suitable assisting node 310 (different from the assisting node 310-*a* and the assisting node 310-*b*).

The node 305-*a* may select one or more assisting nodes 310 based on the content of the second messages received at 320 or information associated with a link between assisting nodes 310 and the node 305-*a* (e.g., link quality between the node 305-*a* and the one or more assisting nodes 310). As one example, the node 305-*a* may select the assisting node 310-*a* over the assisting node 310-*b* because the link quality measurements included in the second message from the assisting node 310-*a* is greater than the link quality measurements included in the second message from the assisting node 310-*b*. Additionally or alternatively, the node 305-*a* may select the assisting node 310-*a* because a link quality between the node 305-*a* and the assisting node 310-*a* is greater than a link quality between the node 305-*a* and the assisting node 310-*b*. In some examples, the node 305-*a* may not select an assisting node 310 and refrain from communicating with the node 305-*b* via an assisted connection based on the contents of the second message received at 320. For example, the second message may include an indication that the node 305-*b* is unable to support a service or application requested by the node 305-*a*. In such case, the node 305-*a* may refrain from communicating with the node 305-*b*.

At 330, the node 305-*a* may transmit a decision message to the assisting node 310-*a* and the assisting node 310-*a*. The decision message may indicate whether the respective assisting node 310 is selected. As one example, the node 305-*c* may select the assisting node 310-*a* and may not selected the assisting node 210-*b*. In such example, the decision message to the assisting node 310-*a* may include a confirmation message indicating that the assisting node 310-*a* is selected and the decision message to the assisting node 310-*b* may include a reject message indicating that the assisting node 310-*b* has not been selected. In another example, if the node 305-*a* choses to refrain from communicating with the node 305-*b* using the assisted connected, the node 305-*a* may transmit a decision message that includes a reject message to both the assisting node 310-*a* and the assisting node 310-*b*.

At 335, the node 305-*a* may attempt to establish an assisted connection with the node 305-*b* using the selected assisting node 310 (e.g., assisting node 310-*a*). That is, the node 305-*a* may transmit multiple discovery messages to the node 305-*b* using one or more assisting devices controlled by the assisting node 310-*a*, where each discovery message is transmitted according to a different assisting device configuration. The number of assisting device configurations used may be equal to the number of assisting device configurations indicated in the reply message received at 320. In some examples, the node 305-*a* may transmit the multiple discovery message using the resources included in the grant indicated in the reply message received at 320.

The node 305-*b* may attempt to decode the discovery messages from the node 305-*a* and determine information related to the decodable discovery signals. The node 305-*b* may then transmit a discovery reply message to the node 305-*a*, where the discovery reply message includes information related to the decoded discovery signals (e.g., link quality measurements of the decoded discovery signals). Based on the contents of the discovery reply message, the node 205-*a* may select an assisting device and corresponding assisting device configuration to use in communicating with the node 305-*b*. In some examples, receiving the discovery messages from the node 305-*a* may trigger the node 305-*b* to find its own suitable assisting node 310 for communicating with the node 305-*a* over a reverse link. That is, the node 305-*b* may undergo similar steps as node 305-*b* (e.g., steps 315-335) to identify an assisting node 310.

At 340, the node 305-*a* may transmit one or more data messages to the node 305-*b* via the selected assisting device according to the determined assisting device configuration.

Figure 4:
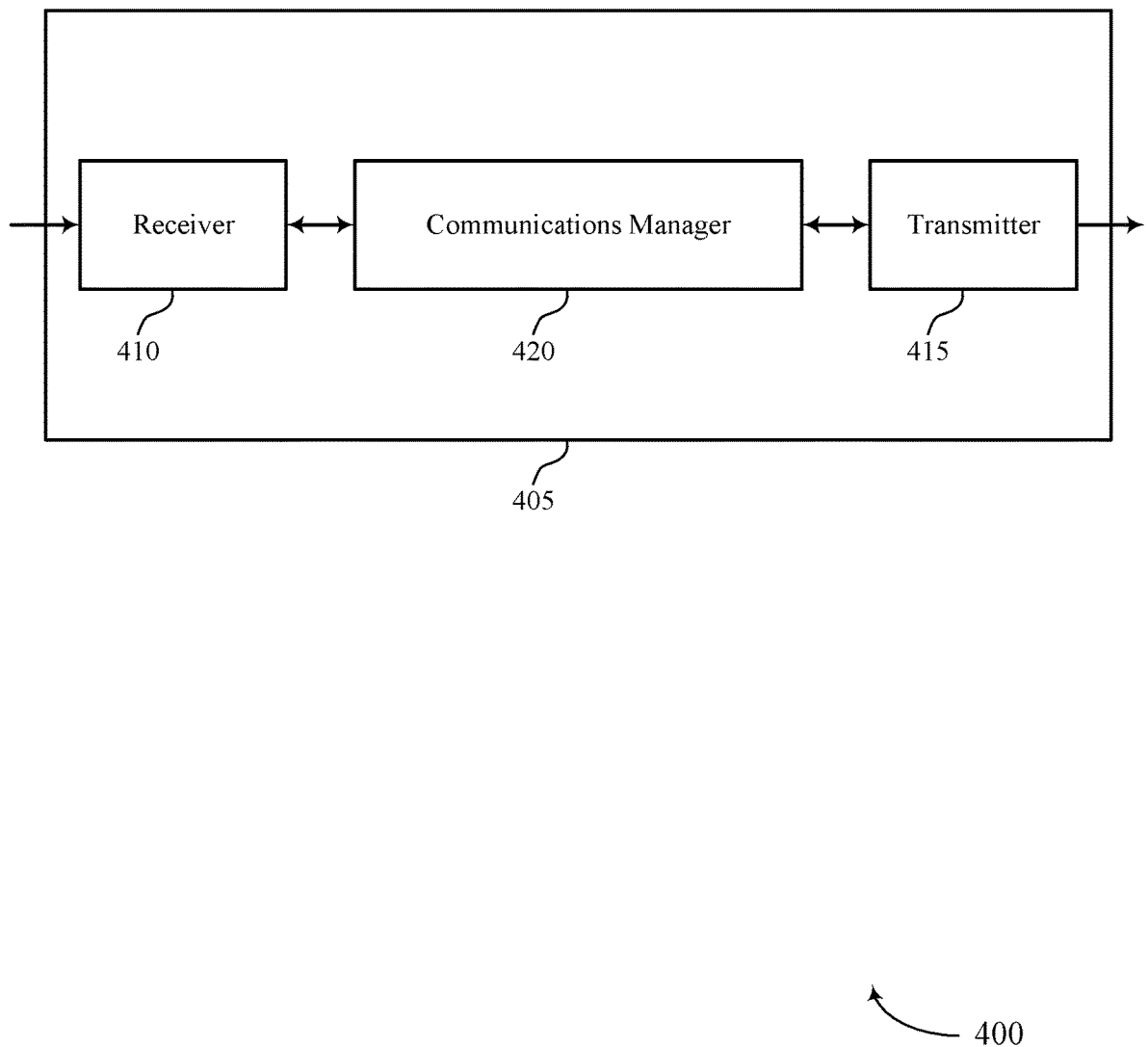
FIGS. 4 and 5 show block diagrams of devices that support signaling schemes for assisted communications between wireless devices in accordance with aspects of the present disclosure.

FIG. 4 shows a block diagram 400 of a device 405 that supports signaling schemes for assisted communications between wireless devices in accordance with aspects of the present disclosure. The device 405 may be an example of aspects of a UE 115 or a base station 105 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to signaling schemes for assisted communications between wireless devices). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to signaling schemes for assisted communications between wireless devices). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of signaling schemes for assisted communications between wireless devices as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a first wireless device in accordance with examples as disclosed herein. For example, the communications manager 420 may be configured as or otherwise support a means for transmitting, to a third wireless device associated with one or more signal relaying devices, a first message querying whether the third wireless device is able to establish a first communications link with a second wireless device, the first message including an identity of the second wireless device. The communications manager 420 may be configured as or otherwise support a means for receiving, from the third wireless device, signaling indicative of whether the third wireless device is able to establish the first communications link with the second wireless device. The communications manager 420 may be configured as or otherwise support a means for communicating, based on the signaling indicating that the third wireless device is able to establish the first communications link, with the second wireless device via a second communications link using a signal relaying device of the one or more signal relaying devices associated with the third wireless device.

Additionally or alternatively, the communications manager 420 may support wireless communications at a third wireless device in accordance with examples as disclosed herein. For example, the communications manager 420 may be configured as or otherwise support a means for receiving, from a first wireless device, a first message querying whether the third wireless device is able to establish a communications link with a second wireless device, the first message including an identity of the second wireless device. The communications manager 420 may be configured as or otherwise support a means for transmitting, to the first wireless device based on attempting to establish the communications link, signaling indicative of whether the third wireless device is able to establish the communications link with the second wireless device. The communications manager 420 may be configured as or otherwise support a means for receiving, from the first wireless device and based on the signaling, an indication of whether the first wireless device will communicate with the second wireless device using a signal relaying device controlled by the third wireless device.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for more efficient utilization of communication resources. The methods as described herein may allow a device 405 to select an assisting node prior to performing a discovery procedure. As such, the device 405 may transmit discovery signals to a second device using the selected assisting node as opposed to multiple candidate assisting devices which may reduce latency in the system and ensure that resources are being used efficiently.

Figure 5:
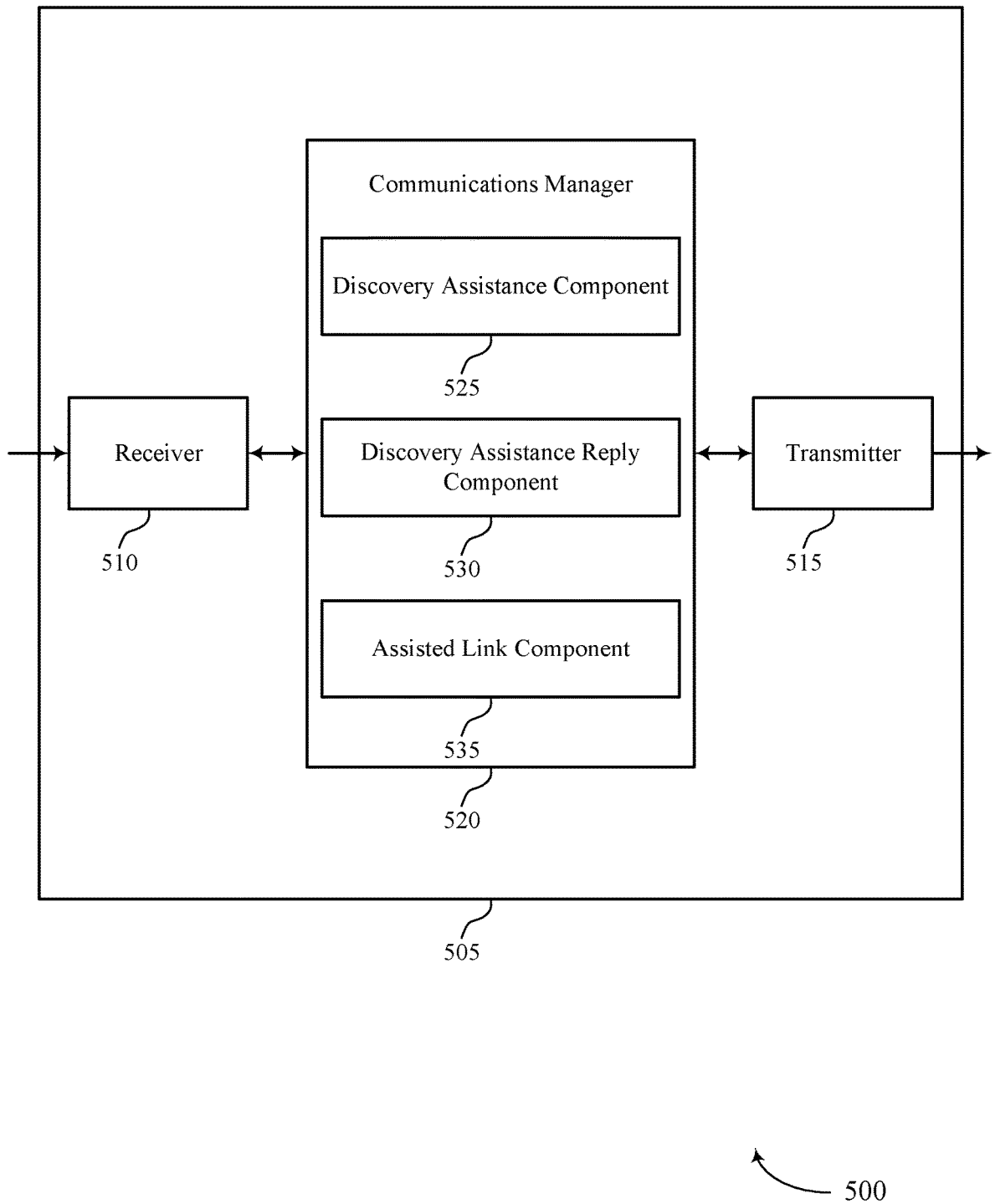

FIG. 5 shows a block diagram 500 of a device 505 that supports signaling schemes for assisted communications between wireless devices in accordance with aspects of the present disclosure. The device 505 may be an example of aspects of a device 405, a UE 115, or a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to signaling schemes for assisted communications between wireless devices). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to signaling schemes for assisted communications between wireless devices). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of signaling schemes for assisted communications between wireless devices as described herein. For example, the communications manager 520 may include a discovery assistance component 525, a discovery assistance reply component 530, an assisted link component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first wireless device in accordance with examples as disclosed herein. The discovery assistance component 525 may be configured as or otherwise support a means for transmitting, to a third wireless device associated with one or more signal relaying devices, a first message querying whether the third wireless device is able to establish a first communications link with a second wireless device, the first message including an identity of the second wireless device. The discovery assistance reply component 530 may be configured as or otherwise support a means for receiving, from the third wireless device, signaling indicative of whether the third wireless device is able to establish the first communications link with the second wireless device. The assisted link component 535 may be configured as or otherwise support a means for communicating, based on the signaling indicating that the third wireless device is able to establish the first communications link, with the second wireless device via a second communications link using a signal relaying device of the one or more signal relaying devices associated with the third wireless device.

Additionally or alternatively, the communications manager 520 may support wireless communications at a third wireless device in accordance with examples as disclosed herein. The discovery assistance component 525 may be configured as or otherwise support a means for receiving, from a first wireless device, a first message querying whether the third wireless device is able to establish a communications link with a second wireless device, the first message including an identity of the second wireless device. The discovery assistance reply component 530 may be configured as or otherwise support a means for transmitting, to the first wireless device based on attempting to establish the communications link, signaling indicative of whether the third wireless device is able to establish the communications link with the second wireless device. The assisted link component 535 may be configured as or otherwise support a means for receiving, from the first wireless device and based on the signaling, an indication of whether the first wireless device will communicate with the second wireless device using a signal relaying device controlled by the third wireless device.

Figure 6:
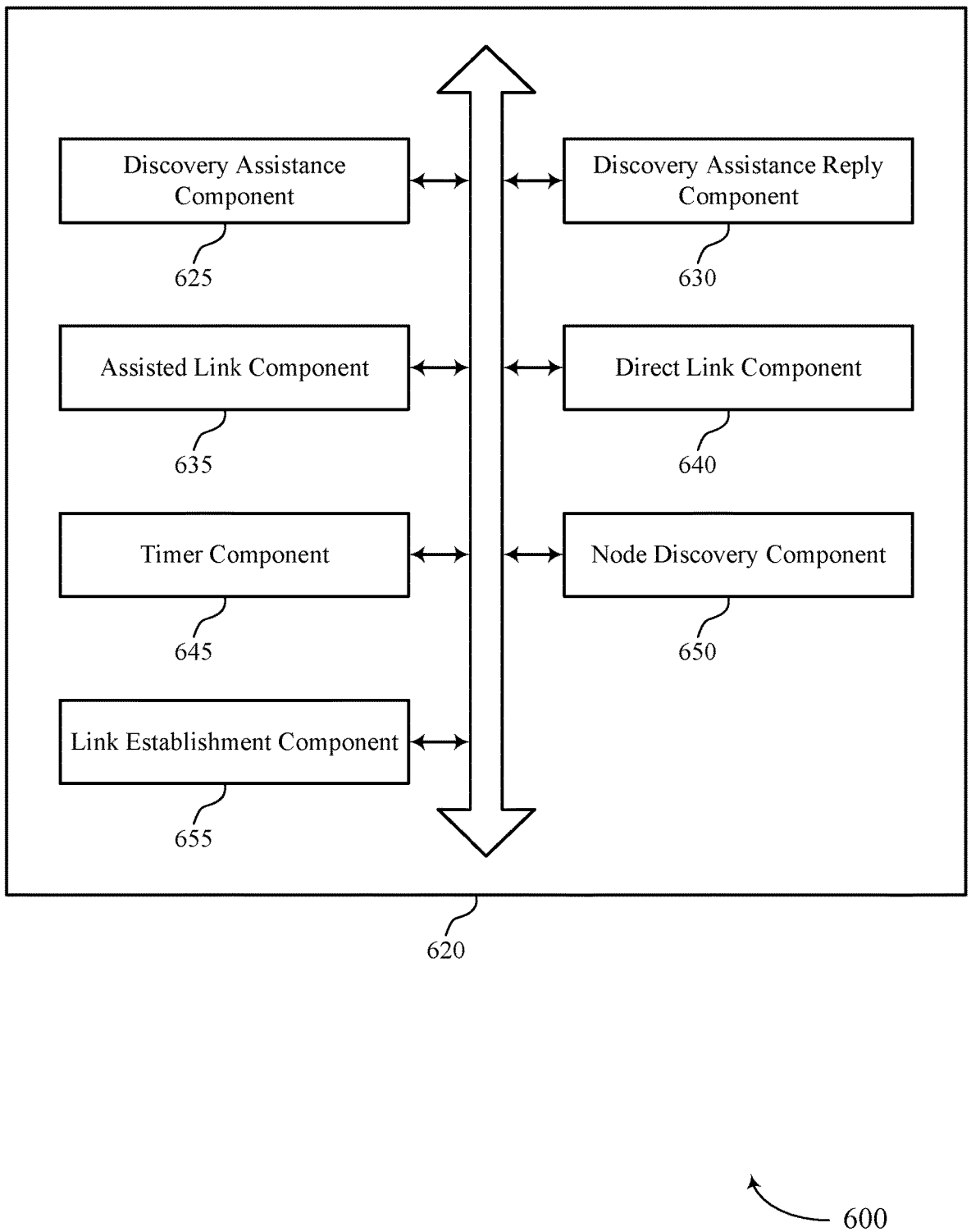
FIG. 6 shows a block diagram of a communications manager that supports signaling schemes for assisted communications between wireless devices in accordance with aspects of the present disclosure.

FIG. 6 shows a block diagram 600 of a communications manager 620 that supports signaling schemes for assisted communications between wireless devices in accordance with aspects of the present disclosure. The communications manager 620 may be an example of aspects of a communications manager 420, a communications manager 520, or both, as described herein. The communications manager

620, or various components thereof, may be an example of means for performing various aspects of signaling schemes for assisted communications between wireless devices as described herein. For example, the communications manager 620 may include a discovery assistance component 625, a discovery assistance reply component 630, an assisted link component 635, a direct link component 640, a timer component 645, a node discovery component 650, a link establishment component 655, or any combination thereof. Each of these components may communicate, directly or indirectly, with one another (e.g., via one or more buses).

The communications manager 620 may support wireless communications at a first wireless device in accordance with examples as disclosed herein. The discovery assistance component 625 may be configured as or otherwise support a means for transmitting, to a third wireless device associated with one or more signal relaying devices, a first message querying whether the third wireless device is able to establish a first communications link with a second wireless device, the first message including an identity of the second wireless device. The discovery assistance reply component 630 may be configured as or otherwise support a means for receiving, from the third wireless device, signaling indicative of whether the third wireless device is able to establish the first communications link with the second wireless device. The assisted link component 635 may be configured as or otherwise support a means for communicating, based on the signaling indicating that the third wireless device is able to establish the first communications link, with the second wireless device via a second communications link using a signal relaying device of the one or more signal relaying devices associated with the third wireless device.

In some examples, the direct link component 640 may be configured as or otherwise support a means for attempting to communicate with the second wireless device over a direct communications link between the first wireless device and the second wireless device, where transmitting the first message to the third wireless device is based on failing to communicate with the second wireless device over the direct communications link.

In some examples, the timer component 645 may be configured as or otherwise support a means for initiating a timer based on transmitting the first message. In some examples, the assisted link component 635 may be configured as or otherwise support a means for determining that the third wireless device is able to establish the first communications link with the second wireless device based on receiving the signaling before an expiration of the timer. In some examples, the first message indicates a value of the timer.

In some examples, the assisted link component 635 may be configured as or otherwise support a means for determining to communicate with the second wireless device via the second communications link using the signal relaying device based on first measurement information associated with a first channel between the first wireless device and the third wireless device, second measurement information associated with a second channel between the third wireless device and the second wireless device, or any combination thereof.

In some examples, the assisted link component 635 may be configured as or otherwise support a means for transmitting, to the third wireless device, a confirmation message indicating that the first wireless device will communicate with the second wireless device using the signal relaying device controlled by the third wireless device.

In some examples, the signaling indicative of whether the third wireless device is able to establish a first communication link with the second wireless device indicates a granted period for use of the signal relaying device by the first wireless device. In some examples, the assisted link component 635 may be configured as or otherwise support a means for transmitting one or more signals to the signal relaying device during the granted period. In some examples, the assisted link component 635 may be configured as or otherwise support a means for determining, based on least in part on transmitting the one or more signals to the signal relaying device during the granted period, one or more parameters for the communicating with the second wireless device via the second communications link using the signal relaying device.

In some examples, the discovery assistance component 625 may be configured as or otherwise support a means for establishing a radio bearer between the first wireless device and the third wireless device before transmitting the first message, where transmitting the first message includes. In some examples, the discovery assistance component 625 may be configured as or otherwise support a means for transmitting a RRC message that includes the first message over the radio bearer between the first wireless device and the third wireless device.

In some examples, to support transmitting the first message, the discovery assistance component 625 may be configured as or otherwise support a means for transmitting a broadcast message that includes the first message.

In some examples, the node discovery component 650 may be configured as or otherwise support a means for performing, prior to transmitting the first message, a discovery procedure to detect the third wireless device.

In some examples, the assisted link component 635 may be configured as or otherwise support a means for receiving, prior to transmitting the first message, a discovery signal from the second wireless device via the signal relaying device controlled by the third wireless device or a second signal relaying device controlled by a fourth wireless device different from the third wireless device.

In some examples, the first message further indicates a type of service requested by the first wireless device, a service requested by the first wireless device, a QoS threshold, a cell identifier associated with the first wireless device or the second wireless device, a group identifier associated with the first wireless device or the second wireless device, or any combination thereof.

In some examples, the signaling indicative of whether the third wireless device is able to establish the second communications link with the second wireless device indicates whether the third wireless device detected the second wireless device, an identifier of the second wireless device, one or more identifiers of one or more third wireless devices different from the second wireless device detected by the third wireless device, one or more link quality measurements associated with the second wireless device, whether the second wireless device supports one or more types of services, a location of the second wireless device, a location of the second wireless device in relation to the third wireless device, a quantity of available configurations for the signal relaying device, or any combination thereof.

In some examples, the signal relaying device includes a relay, a repeater, a RIS, a metasurface, or any combination thereof and the third wireless device includes a controller for the signal relaying device.

Additionally or alternatively, the communications manager 620 may support wireless communications at a third wireless device in accordance with examples as disclosed herein. In some examples, the discovery assistance component 625 may be configured as or otherwise support a means for receiving, from a first wireless device, a first message querying whether the third wireless device is able to establish a communications link with a second wireless device, the first message including an identity of the second wireless device. In some examples, the discovery assistance reply component 630 may be configured as or otherwise support a means for transmitting, to the first wireless device based on attempting to establish the communications link, signaling indicative of whether the third wireless device is able to establish the communications link with the second wireless device. In some examples, the assisted link component 635 may be configured as or otherwise support a means for receiving, from the first wireless device and based on the signaling, an indication of whether the first wireless device will communicate with the second wireless device using a signal relaying device controlled by the third wireless device.

In some examples, the link establishment component 655 may be configured as or otherwise support a means for determining, based on receiving the first message, that the third wireless device is able to establish the communications link with the second wireless device. In some examples, the discovery assistance component 625 may be configured as or otherwise support a means for transmitting, to the second wireless device, a second message indicating a type of service requested by the first wireless device, a service requested by the first wireless device, an application associated with the first wireless device, or any combination thereof.

In some examples, the discovery assistance reply component 630 may be configured as or otherwise support a means for receiving, from the second wireless device, an indication of whether the second wireless device supports the type of service, the service, the application, or any combination thereof.

In some examples, to support determining that the third wireless device is able to establish the communications link with the second wireless device, the link establishment component 655 may be configured as or otherwise support a means for identifying that the communications link with the second wireless device was already established prior to receiving the first message. In some examples, to support determining that the third wireless device is able to establish the communications link with the second wireless device, the link establishment component 655 may be configured as or otherwise support a means for establishing the communications link with the second wireless device after receiving the first message.

In some examples, the discovery assistance reply component 630 may be configured as or otherwise support a means for monitoring for one or more synchronization signals from the second wireless device based on receiving the first message. In some examples, the discovery assistance reply component 630 may be configured as or otherwise support a means for measuring the one or more synchronization signals to determine one or more link quality measurements associated with the one or more synchronization signals, where the signaling indicative of whether the third wireless device is able to establish the communications link with the second wireless device indicates the one or more link quality measurements.

In some examples, the discovery assistance component 625 may be configured as or otherwise support a means for transmitting, to the second wireless device and based on receiving the first message, a broadcast message that includes at least a portion of the first message.

In some examples, the broadcast message further includes an indication of one or more resources for the second wireless device to use to establish the communications link.

In some examples, the signaling indicative of whether the third wireless device is able to establish the communications link with the second wireless device indicates a granted period for use of the signal relaying device by the first wireless device.

In some examples, the discovery assistance component 625 may be configured as or otherwise support a means for establishing a radio bearer between the third wireless device and the first wireless device before receiving the first message, where receiving the first message includes. In some examples, the discovery assistance component 625 may be configured as or otherwise support a means for receiving a RRC message that includes the first message over the radio bearer between the first wireless device and the third wireless device.

In some examples, to support receiving the first message, the discovery assistance component 625 may be configured as or otherwise support a means for receiving a broadcast message that includes the first message.

In some examples, the first message further indicates a type of service requested by the first wireless device, a service requested by the first wireless device, a QoS threshold, a cell identifier associated with the first wireless device or the second wireless device, a group identifier associated with the first wireless device or the second wireless device, or any combination thereof.

In some examples, the signaling indicative of whether the third wireless device is able to establish the communications link with the second wireless device indicates a value of a timer, whether the third wireless device has detected the second wireless device, an identifier of the second wireless device, one or more identifiers of one or more additional wireless devices detected by the third wireless device and different from the second wireless device, one or more link quality measurements associated with the second wireless device, whether the second wireless device supports one or more types of services, a location of the second wireless device, a location of the second wireless device relative to the third wireless device, a quantity of available configurations for the signal relaying device, or any combination thereof.

In some examples, the signal relaying device includes a relay, a repeater, a RIS, a metasurface, or any combination thereof and the third wireless device includes a controller for the signal relaying device.

Figure 7:
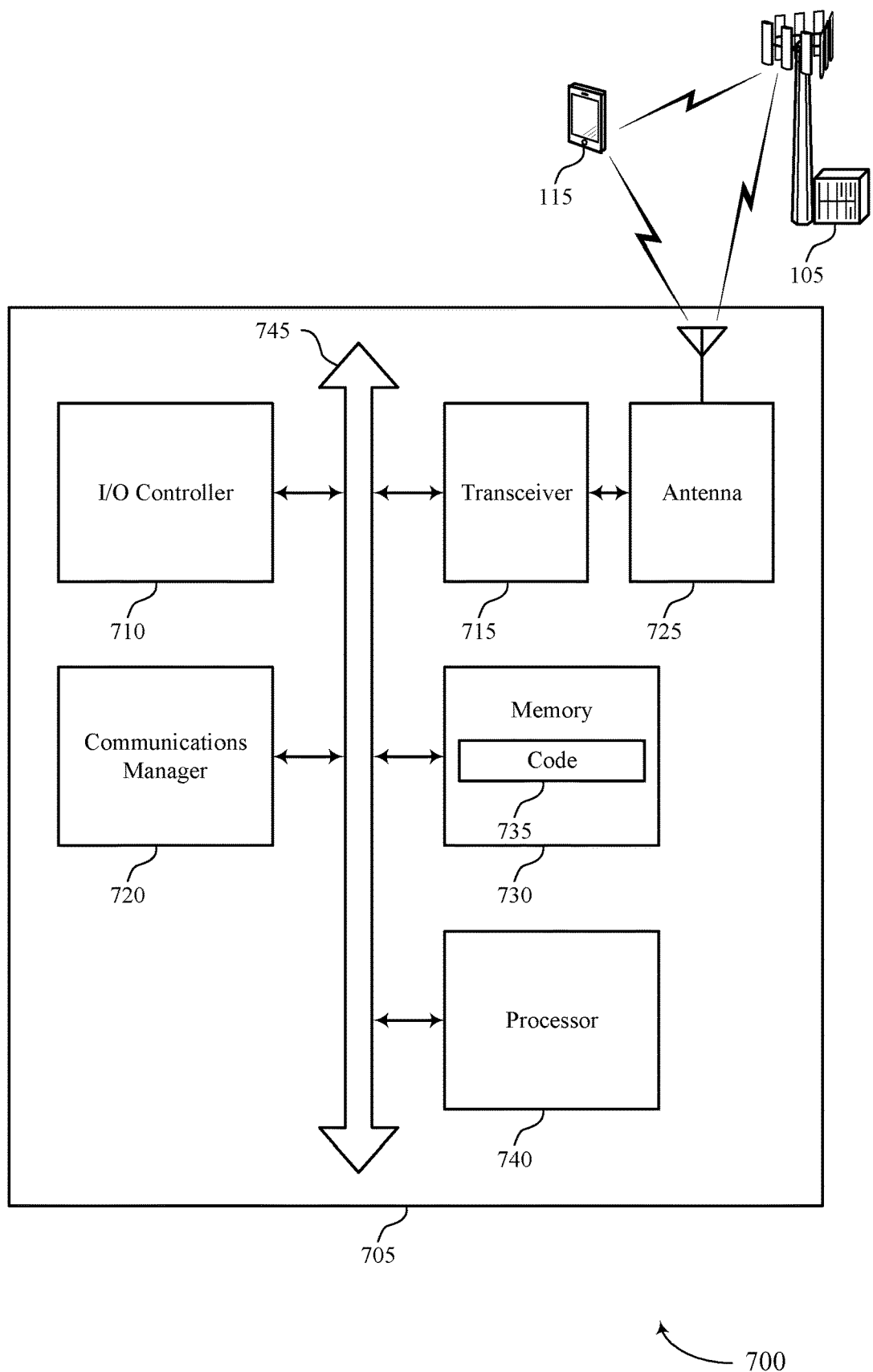
FIG. 7 shows a diagram of a system including a UE that supports signaling schemes for assisted communications between wireless devices in accordance with aspects of the present disclosure.

FIG. 7 shows a diagram of a system 700 including a device 705 that supports signaling schemes for assisted communications between wireless devices in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting signaling schemes for assisted communications between wireless devices). For example, the device 705 or a component of the device 705 may include a processor 740 and memory 730 coupled to the processor 740, the processor 740 and memory 730 configured to perform various functions described herein.

The communications manager 720 may support wireless communications at a first wireless device in accordance with examples as disclosed herein. For example, the communications manager 720 may be configured as or otherwise support a means for transmitting, to a third wireless device associated with one or more signal relaying devices, a first message querying whether the third wireless device is able to establish a first communications link with a second wireless device, the first message including an identity of the second wireless device. The communications manager 720 may be configured as or otherwise support a means for receiving, from the third wireless device, signaling indicative of whether the third wireless device is able to establish the first communications link with the second wireless device. The communications manager 720 may be configured as or otherwise support a means for communicating, based on the signaling indicating that the third wireless device is able to establish the first communications link, with the second wireless device via a second communications link using a signal relaying device of the one or more signal relaying devices associated with the third wireless device.

Additionally or alternatively, the communications manager 720 may support wireless communications at a third wireless device in accordance with examples as disclosed herein. For example, the communications manager 720 may be configured as or otherwise support a means for receiving, from a first wireless device, a first message querying whether the third wireless device is able to establish a communications link with a second wireless device, the first message including an identity of the second wireless device. The communications manager 720 may be configured as or otherwise support a means for transmitting, to the first wireless device based on attempting to establish the communications link, signaling indicative of whether the third wireless device is able to establish the communications link with the second wireless device. The communications manager 720 may be configured as or otherwise support a means for receiving, from the first wireless device and based on the signaling, an indication of whether the first wireless device will communicate with the second wireless device using a signal relaying device controlled by the third wireless device.

By including or configuring the communications manager 720 in accordance with examples as described herein, the device 705 may support techniques for reduced latency, more efficient utilization of communication resources, and improved coordination between devices In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of signaling schemes for assisted communications between wireless devices as described herein, or the processor 740 and the memory 730 may be otherwise configured to perform or support such operations.

Figure 8:
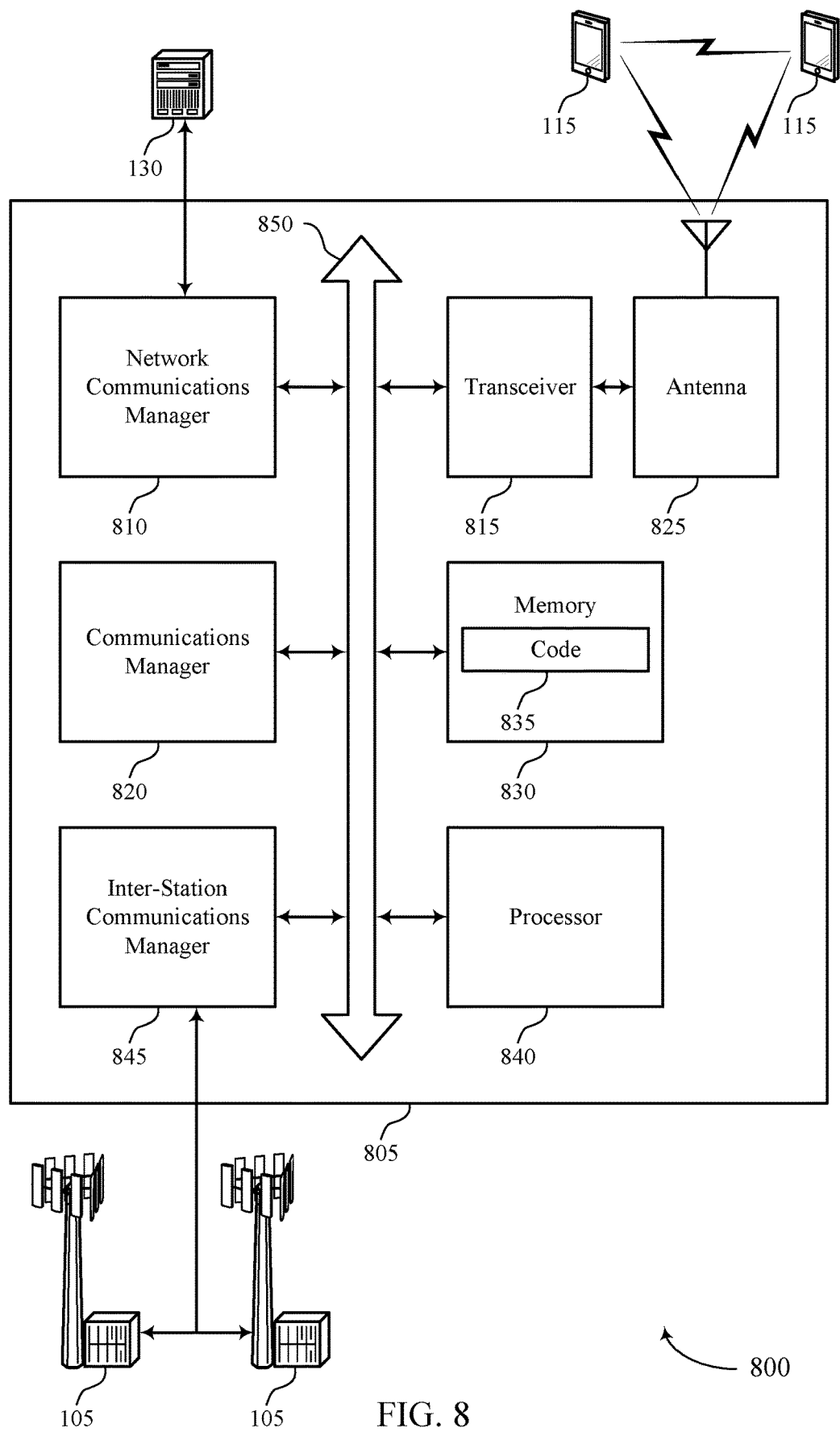
FIG. 8 shows a diagram of a system including a base station that supports signaling schemes for assisted communications between wireless devices in accordance with aspects of the present disclosure.

FIG. 8 shows a diagram of a system 800 including a device 805 that supports signaling schemes for assisted communications between wireless devices in accordance with aspects of the present disclosure. The device 805 may be an example of or include the components of a device 405, a device 505, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 415, a transmitter 515, a receiver 410, a receiver 510, or any combination thereof or component thereof, as described herein.

The memory 830 may include RAM and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a BIOS which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting signaling schemes for assisted communications between wireless devices). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communications at a first wireless device in accordance with examples as disclosed herein. For example, the communications manager 820 may be configured as or otherwise support a means for transmitting, to a third wireless device associated with one or more signal relaying devices, a first message querying whether the third wireless device is able to establish a first communications link with a second wireless device, the first message including an identity of the second wireless device. The communications manager 820 may be configured as or otherwise support a means for receiving, from the third wireless device, signaling indicative of whether the third wireless device is able to establish the first communications link with the second wireless device. The communications manager 820 may be configured as or otherwise support a means for communicating, based on the signaling indicating that the third wireless device is able to establish the first communications link, with the second wireless device via a second communications link using a signal relaying device of the one or more signal relaying devices associated with the third wireless device.

Additionally or alternatively, the communications manager 820 may support wireless communications at a third wireless device in accordance with examples as disclosed herein. For example, the communications manager 820 may be configured as or otherwise support a means for receiving, from a first wireless device, a first message querying whether the third wireless device is able to establish a communications link with a second wireless device, the first message including an identity of the second wireless device. The communications manager 820 may be configured as or otherwise support a means for transmitting, to the first wireless device based on attempting to establish the communications link, signaling indicative of whether the third wireless device is able to establish the communications link with the second wireless device. The communications manager 820 may be configured as or otherwise support a means for receiving, from the first wireless device and based on the signaling, an indication of whether the first wireless device will communicate with the second wireless device using a signal relaying device controlled by the third wireless device.

By including or configuring the communications manager 820 in accordance with examples as described herein, the device 805 may support techniques for reduced latency, more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of signaling schemes for assisted communications between wireless devices as described herein, or the processor 840 and the memory 830 may be otherwise configured to perform or support such operations.

Figure 9:
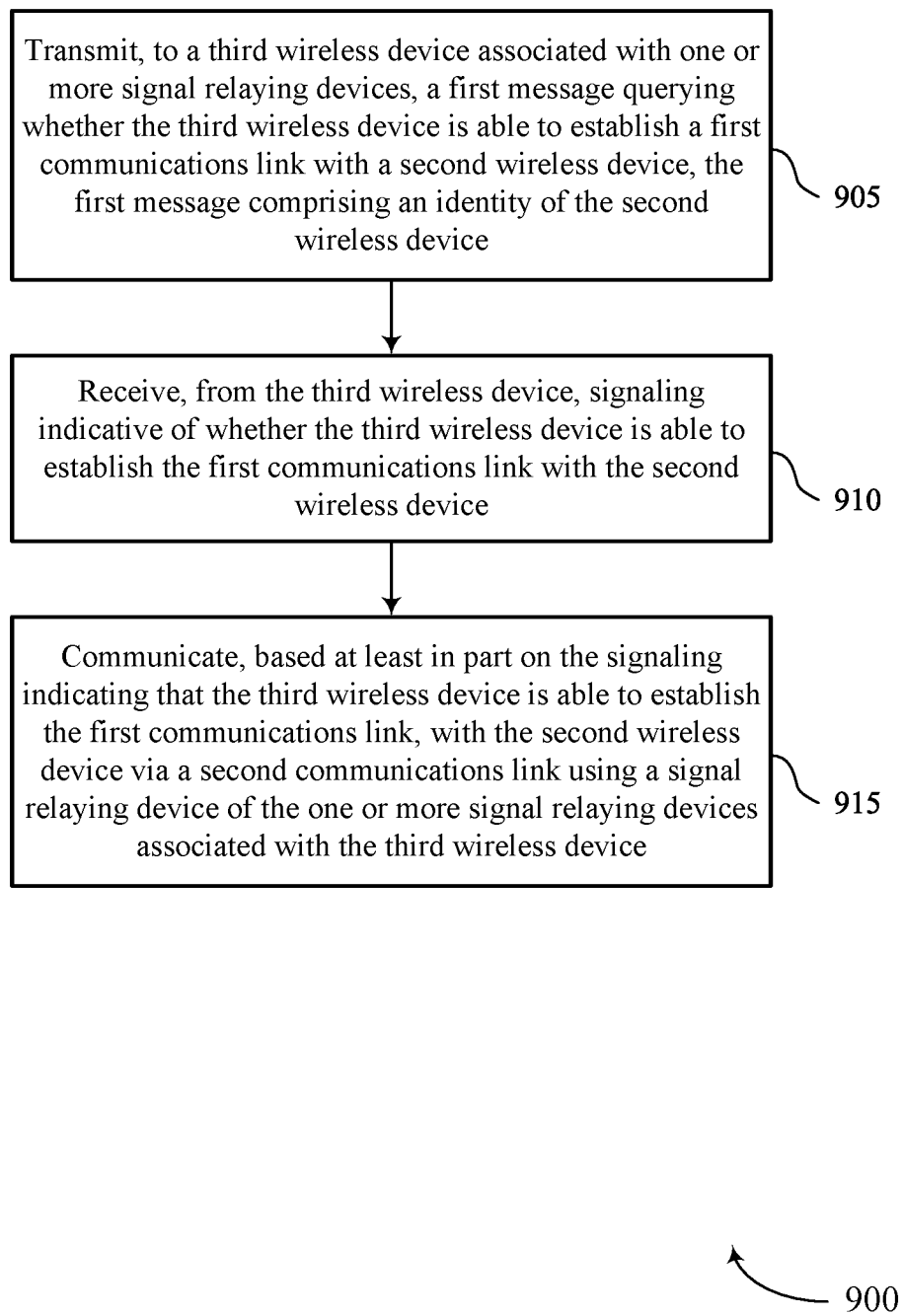
FIGS. 9 through 15 show flowcharts illustrating methods that support signaling schemes for assisted communications between wireless devices in accordance with aspects of the present disclosure.

FIG. 9 shows a flowchart illustrating a method 900 that supports signaling schemes for assisted communications between wireless devices in accordance with aspects of the present disclosure. The operations of the method 900 may be implemented by a UE or a base station or its components as described herein. For example, the operations of the method 900 may be performed by a UE 115 or a base station 105 as described with reference to FIGS. 1 through 8. In some examples, a UE or a base station may execute a set of instructions to control the functional elements of the UE or the base station to perform the described functions. Additionally or alternatively, the UE or the base station may perform aspects of the described functions using special-purpose hardware.

At 905, the method may include transmitting, to a third wireless device associated with one or more signal relaying devices, a first message querying whether the third wireless device is able to establish a first communications link with a second wireless device, the first message including an identity of the second wireless device. The operations of 905 may be performed in accordance with examples as disclosed herein. In some examples, aspects of the operations of 905 may be performed by a discovery assistance component 625 as described with reference to FIG. 6.

At 910, the method may include receiving, from the third wireless device, signaling indicative of whether the third wireless device is able to establish the first communications link with the second wireless device. The operations of 910 may be performed in accordance with examples as disclosed herein. In some examples, aspects of the operations of 910 may be performed by a discovery assistance reply component 630 as described with reference to FIG. 6.

At 915, the method may include communicating, based on the signaling indicating that the third wireless device is able to establish the first communications link, with the second wireless device via a second communications link using a signal relaying device of the one or more signal relaying devices associated with the third wireless device. The operations of 915 may be performed in accordance with examples as disclosed herein. In some examples, aspects of the operations of 915 may be performed by an assisted link component 635 as described with reference to FIG. 6.

Figure 10:
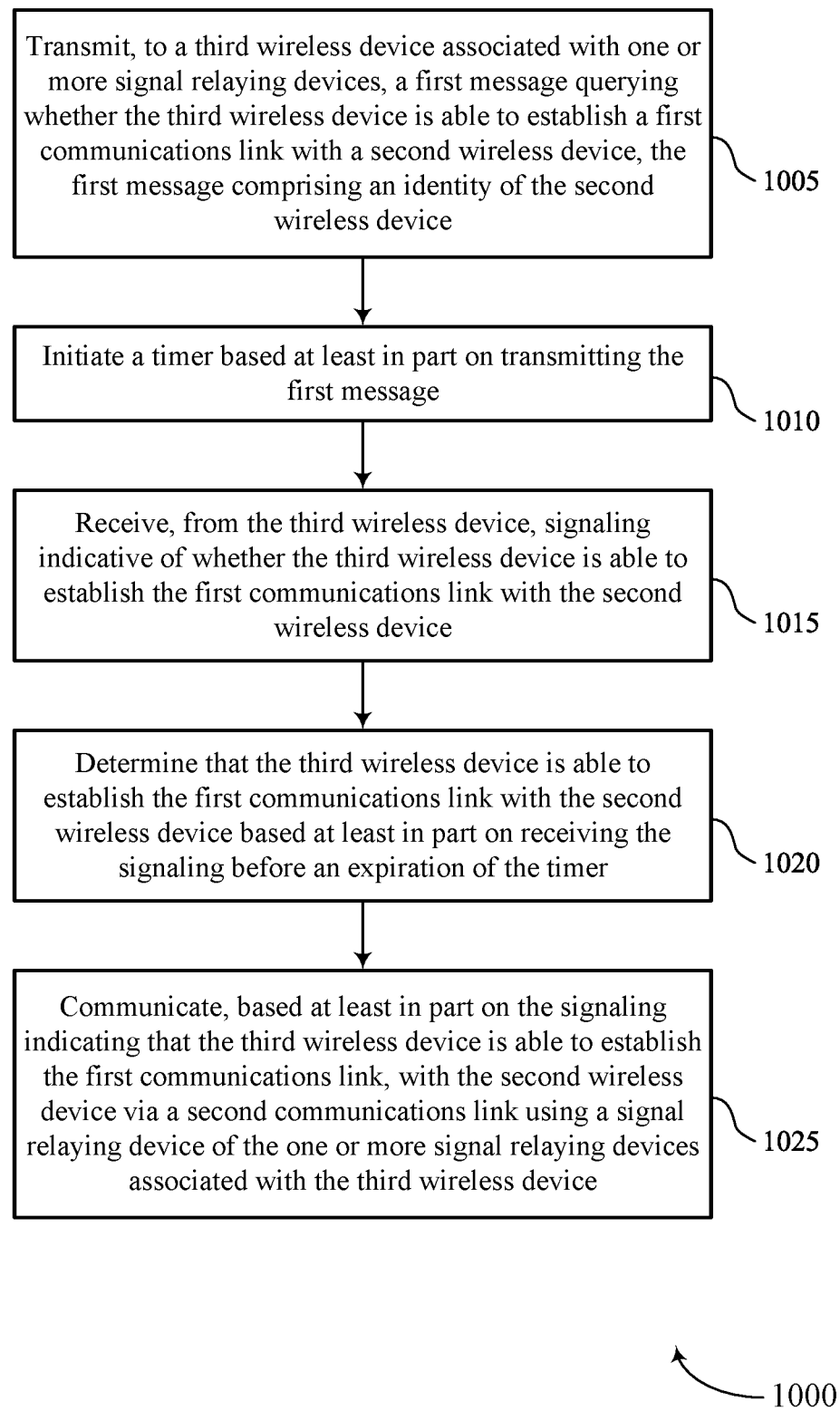

FIG. 10 shows a flowchart illustrating a method 1000 that supports signaling schemes for assisted communications between wireless devices in accordance with aspects of the present disclosure. The operations of the method 1000 may be implemented by a UE or a base station or its components as described herein. For example, the operations of the method 1000 may be performed by a UE 115 or a base station 105 as described with reference to FIGS. 1 through 8. In some examples, a UE or a base station may execute a set of instructions to control the functional elements of the UE or the base station to perform the described functions. Additionally or alternatively, the UE or the base station may perform aspects of the described functions using special-purpose hardware.

At 1005, the method may include transmitting, to a third wireless device associated with one or more signal relaying devices, a first message querying whether the third wireless device is able to establish a first communications link with a second wireless device, the first message including an identity of the second wireless device. The operations of 1005 may be performed in accordance with examples as disclosed herein. In some examples, aspects of the operations of 1005 may be performed by a discovery assistance component 625 as described with reference to FIG. 6.

At 1010, the method may include initiating a timer based on transmitting the first message. The operations of 1010 may be performed in accordance with examples as disclosed herein. In some examples, aspects of the operations of 1010 may be performed by a timer component 645 as described with reference to FIG. 6.

At 1015, the method may include receiving, from the third wireless device, signaling indicative of whether the third wireless device is able to establish the first communications link with the second wireless device. The operations of 1015 may be performed in accordance with examples as disclosed herein. In some examples, aspects of the operations of 1015 may be performed by a discovery assistance reply component 630 as described with reference to FIG. 6.

At 1020, the method may include determining that the third wireless device is able to establish the first communications link with the second wireless device based on receiving the signaling before an expiration of the timer. The operations of 1020 may be performed in accordance with examples as disclosed herein. In some examples, aspects of the operations of 1020 may be performed by an assisted link component 635 as described with reference to FIG. 6.

At 1025, the method may include communicating, based on the signaling indicating that the third wireless device is able to establish the first communications link, with the second wireless device via a second communications link using a signal relaying device of the one or more signal relaying devices associated with the third wireless device. The operations of 1025 may be performed in accordance with examples as disclosed herein. In some examples, aspects of the operations of 1025 may be performed by an assisted link component 635 as described with reference to FIG. 6.

Figure 11:
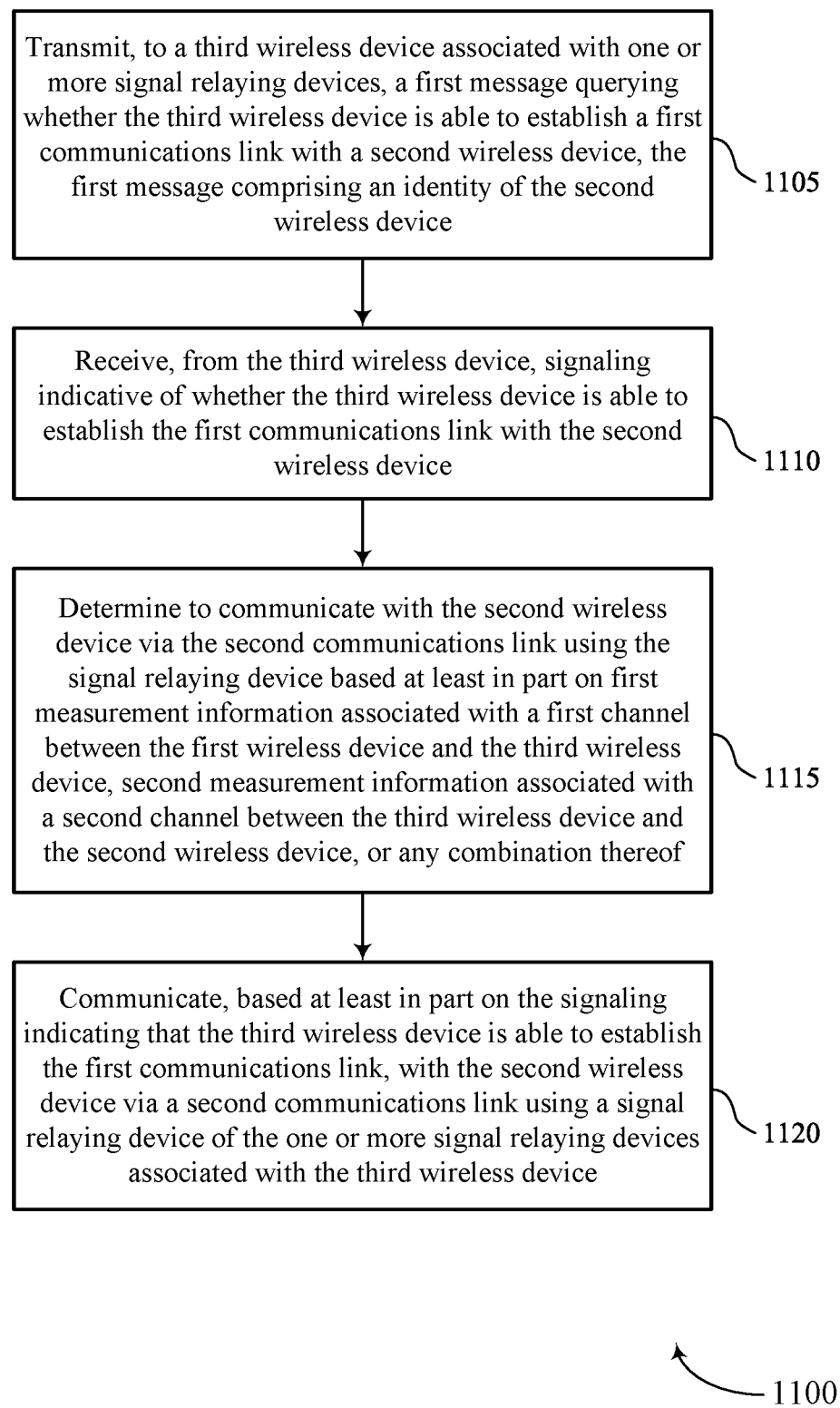

FIG. 11 shows a flowchart illustrating a method 1100 that supports signaling schemes for assisted communications between wireless devices in accordance with aspects of the present disclosure. The operations of the method 1100 may be implemented by a UE or a base station or its components as described herein. For example, the operations of the method 1100 may be performed by a UE 115 or a base station 105 as described with reference to FIGS. 1 through 8. In some examples, a UE or a base station may execute a set of instructions to control the functional elements of the UE or the base station to perform the described functions. Additionally or alternatively, the UE or the base station may perform aspects of the described functions using special-purpose hardware.

At 1105, the method may include transmitting, to a third wireless device associated with one or more signal relaying devices, a first message querying whether the third wireless device is able to establish a first communications link with a second wireless device, the first message including an identity of the second wireless device. The operations of 1105 may be performed in accordance with examples as disclosed herein. In some examples, aspects of the operations of 1105 may be performed by a discovery assistance component 625 as described with reference to FIG. 6.

At 1110, the method may include receiving, from the third wireless device, signaling indicative of whether the third wireless device is able to establish the first communications link with the second wireless device. The operations of 1110 may be performed in accordance with examples as disclosed herein. In some examples, aspects of the operations of 1110 may be performed by a discovery assistance reply component 630 as described with reference to FIG. 6.

At 1115, the method may include determining to communicate with the second wireless device via the second communications link using the signal relaying device based on first measurement information associated with a first channel between the first wireless device and the third wireless device, second measurement information associated with a second channel between the third wireless device and the second wireless device, or any combination thereof. The operations of 1115 may be performed in accordance with examples as disclosed herein. In some examples, aspects of the operations of 1115 may be performed by an assisted link component 635 as described with reference to FIG. 6.

At 1120, the method may include communicating, based on the signaling indicating that the third wireless device is able to establish the first communications link, with the second wireless device via a second communications link using a signal relaying device of the one or more signal relaying devices associated with the third wireless device. The operations of 1120 may be performed in accordance with examples as disclosed herein. In some examples, aspects of the operations of 1120 may be performed by an assisted link component 635 as described with reference to FIG. 6.

Figure 12:
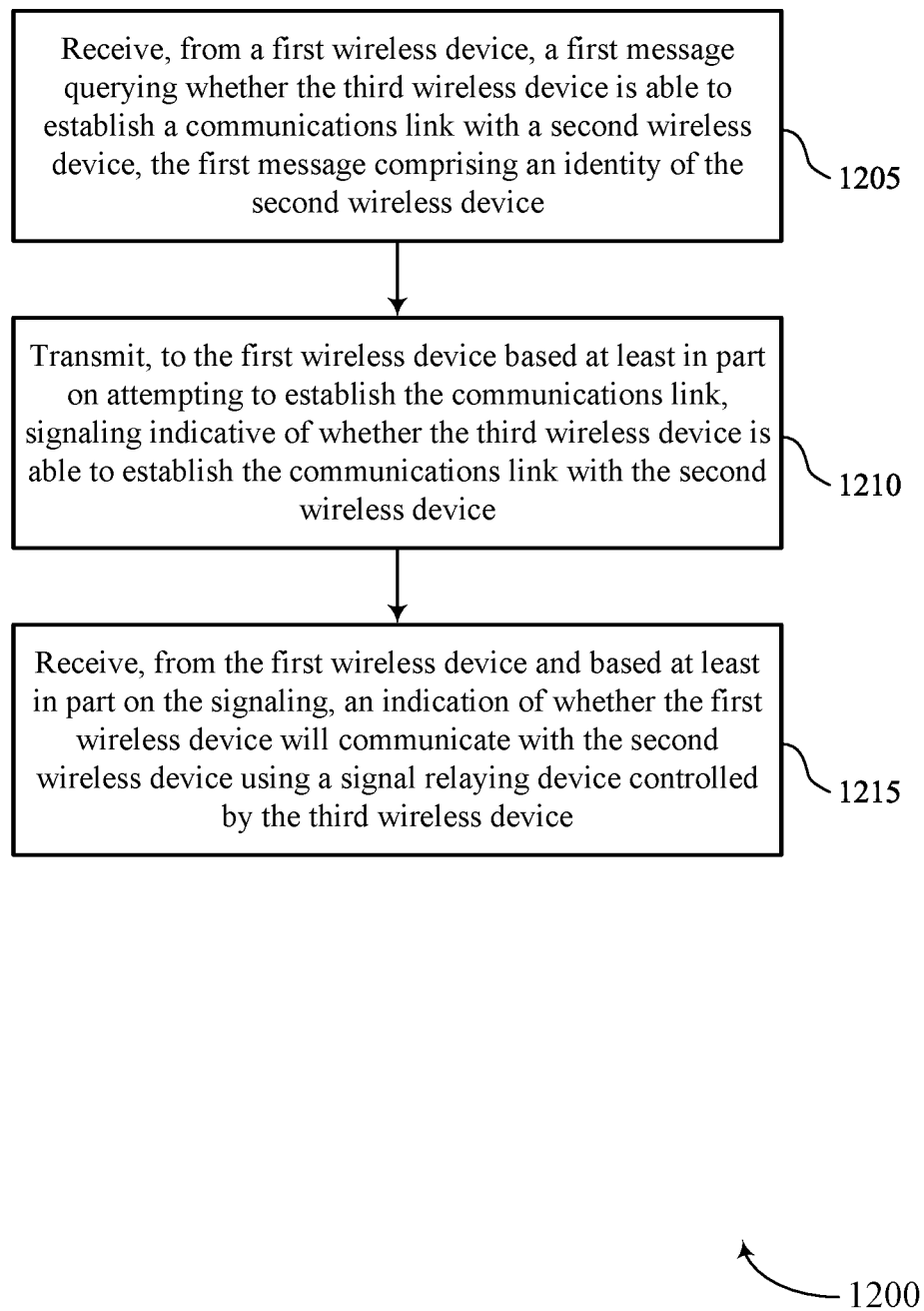

FIG. 12 shows a flowchart illustrating a method 1200 that supports signaling schemes for assisted communications between wireless devices in accordance with aspects of the present disclosure. The operations of the method 1200 may be implemented by a UE or a base station or its components as described herein. For example, the operations of the method 1200 may be performed by a UE 115 or a base station 105 as described with reference to FIGS. 1 through 8. In some examples, a UE or a base station may execute a set of instructions to control the functional elements of the UE or the base station to perform the described functions. Additionally or alternatively, the UE or the base station may perform aspects of the described functions using special-purpose hardware.

At 1205, the method may include receiving, from a first wireless device, a first message querying whether the third wireless device is able to establish a communications link with a second wireless device, the first message including an identity of the second wireless device. The operations of 1205 may be performed in accordance with examples as disclosed herein. In some examples, aspects of the operations of 1205 may be performed by a discovery assistance component 625 as described with reference to FIG. 6.

At 1210, the method may include transmitting, to the first wireless device based on attempting to establish the communications link, signaling indicative of whether the third wireless device is able to establish the communications link with the second wireless device. The operations of 1210 may be performed in accordance with examples as disclosed herein. In some examples, aspects of the operations of 1210 may be performed by a discovery assistance reply component 630 as described with reference to FIG. 6.

At 1215, the method may include receiving, from the first wireless device and based on the signaling, an indication of whether the first wireless device will communicate with the second wireless device using a signal relaying device controlled by the third wireless device. The operations of 1215 may be performed in accordance with examples as disclosed herein. In some examples, aspects of the operations of 1215 may be performed by an assisted link component 635 as described with reference to FIG. 6.

Figure 13:
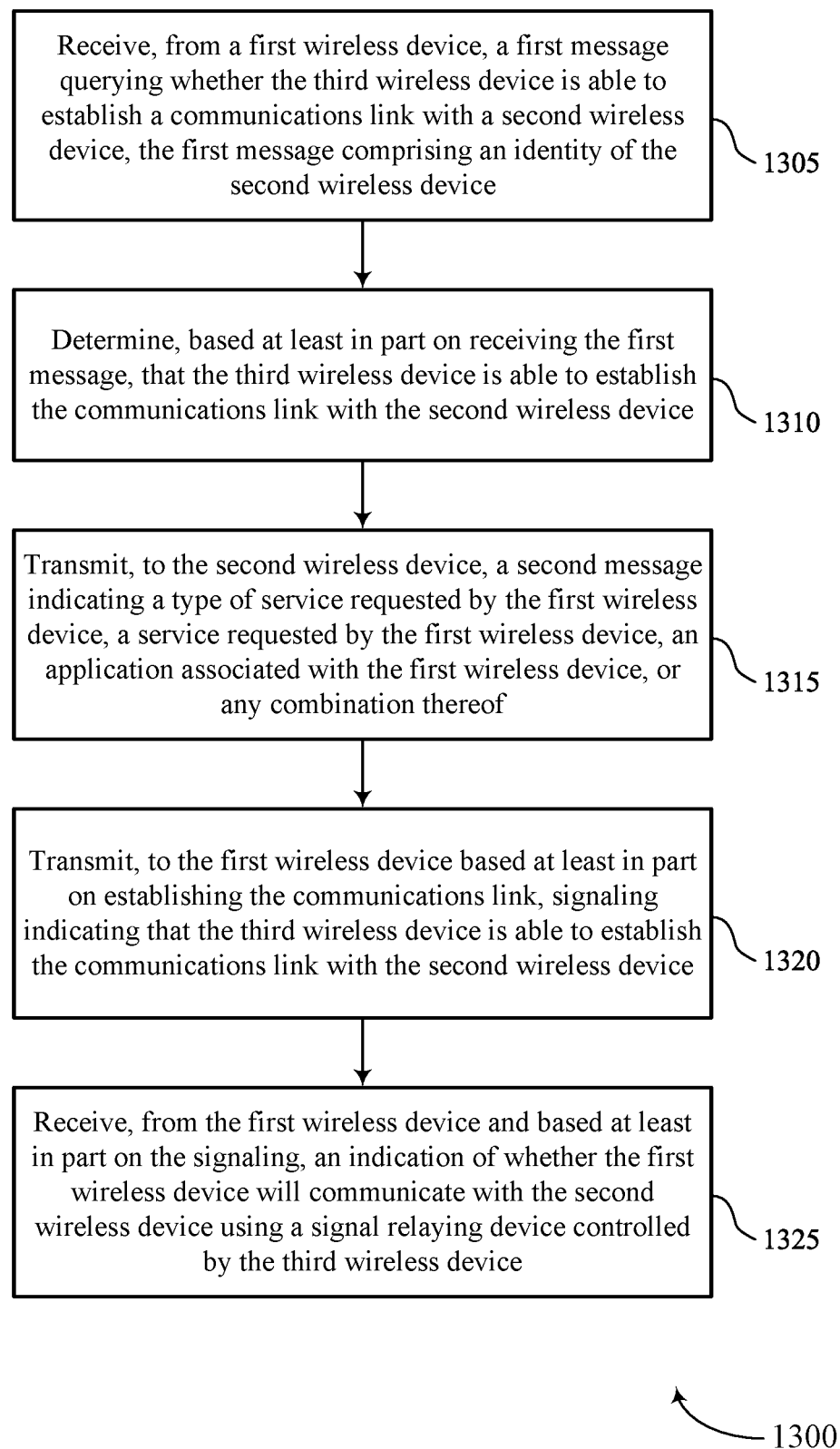

FIG. 13 shows a flowchart illustrating a method 1300 that supports signaling schemes for assisted communications between wireless devices in accordance with aspects of the present disclosure. The operations of the method 1300 may be implemented by a UE or a base station or its components as described herein. For example, the operations of the method 1300 may be performed by a UE 115 or a base station 105 as described with reference to FIGS. 1 through 8. In some examples, a UE or a base station may execute a set of instructions to control the functional elements of the UE or the base station to perform the described functions. Additionally or alternatively, the UE or the base station may perform aspects of the described functions using special-purpose hardware.

At 1305, the method may include receiving, from a first wireless device, a first message querying whether the third wireless device is able to establish a communications link with a second wireless device, the first message including an identity of the second wireless device. The operations of 1305 may be performed in accordance with examples as disclosed herein. In some examples, aspects of the operations of 1305 may be performed by a discovery assistance component 625 as described with reference to FIG. 6.

At 1310, the method may include determining, based on receiving the first message, that the third wireless device is able to establish the communications link with the second wireless device. The operations of 1310 may be performed in accordance with examples as disclosed herein. In some examples, aspects of the operations of 1310 may be performed by a link establishment component 655 as described with reference to FIG. 6.

At 1315, the method may include transmitting, to the second wireless device, a second message indicating a type of service requested by the first wireless device, a service requested by the first wireless device, an application associated with the first wireless device, or any combination thereof. The operations of 1315 may be performed in accordance with examples as disclosed herein. In some examples, aspects of the operations of 1315 may be performed by a discovery assistance component 625 as described with reference to FIG. 6.

At 1320, the method may include transmitting, to the first wireless device based on establishing the communications link, signaling indicating that the third wireless device is able to establish the communications link with the second wireless device. The operations of 1320 may be performed in accordance with examples as disclosed herein. In some examples, aspects of the operations of 1320 may be performed by a discovery assistance reply component 630 as described with reference to FIG. 6.

At 1325, the method may include receiving, from the first wireless device and based on the signaling, an indication of whether the first wireless device will communicate with the second wireless device using a signal relaying device controlled by the third wireless device. The operations of 1325 may be performed in accordance with examples as disclosed herein. In some examples, aspects of the operations of 1325 may be performed by an assisted link component 635 as described with reference to FIG. 6.

Figure 14:
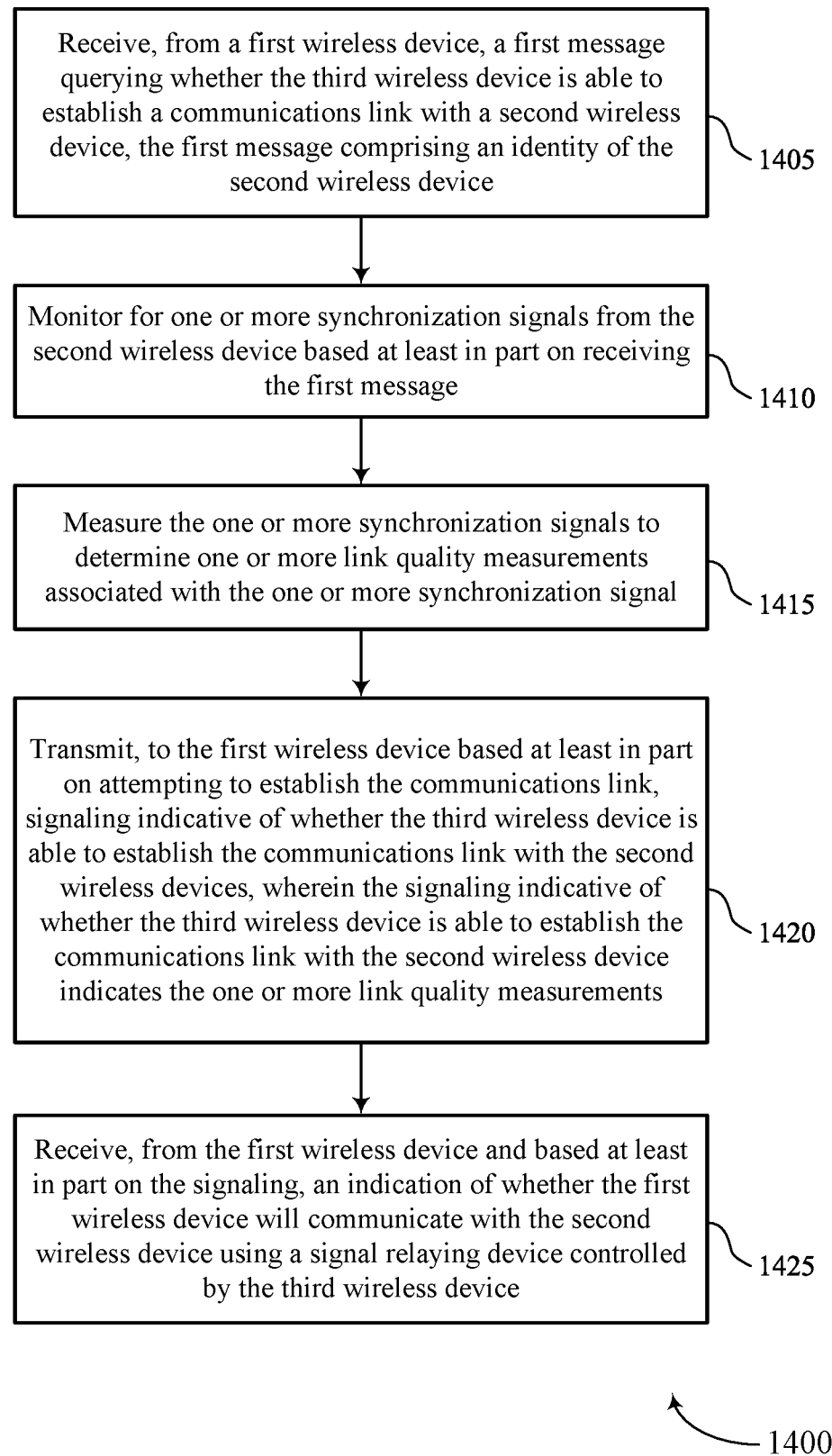

FIG. 14 shows a flowchart illustrating a method 1400 that supports signaling schemes for assisted communications between wireless devices in accordance with aspects of the present disclosure. The operations of the method 1400 may be implemented by a UE or a base station or its components as described herein. For example, the operations of the method 1400 may be performed by a UE 115 or a base station 105 as described with reference to FIGS. 1 through 8. In some examples, a UE or a base station may execute a set of instructions to control the functional elements of the UE or the base station to perform the described functions. Additionally or alternatively, the UE or the base station may perform aspects of the described functions using special-purpose hardware.

At 1405, the method may include receiving, from a first wireless device, a first message querying whether the third wireless device is able to establish a communications link with a second wireless device, the first message including an identity of the second wireless device. The operations of 1405 may be performed in accordance with examples as disclosed herein. In some examples, aspects of the operations of 1405 may be performed by a discovery assistance component 625 as described with reference to FIG. 6.

At 1410, the method may include monitoring for one or more synchronization signals from the second wireless device based on receiving the first message. The operations of 1410 may be performed in accordance with examples as disclosed herein. In some examples, aspects of the operations of 1410 may be performed by a discovery assistance reply component 630 as described with reference to FIG. 6.

At 1415, the method may include measuring the one or more synchronization signals to determine one or more link quality measurements associated with the one or more synchronization signals. The operations of 1415 may be performed in accordance with examples as disclosed herein. In some examples, aspects of the operations of 1415 may be performed by a discovery assistance reply component 630 as described with reference to FIG. 6.

At 1420, the method may include transmitting, to the first wireless device based on attempting to establish the communications link, signaling indicative of whether the third wireless device is able to establish the communications link with the second wireless device, where the signaling indicative of whether the third wireless device is able to establish the communications link with the second wireless device indicates the one or more link quality measurements. The operations of 1420 may be performed in accordance with examples as disclosed herein. In some examples, aspects of the operations of 1420 may be performed by a discovery assistance reply component 630 as described with reference to FIG. 6.

At 1425, the method may include receiving, from the first wireless device and based on the signaling, an indication of whether the first wireless device will communicate with the second wireless device using a signal relaying device controlled by the third wireless device. The operations of 1425 may be performed in accordance with examples as disclosed herein. In some examples, aspects of the operations of 1425 may be performed by an assisted link component 635 as described with reference to FIG. 6.

Figure 15:
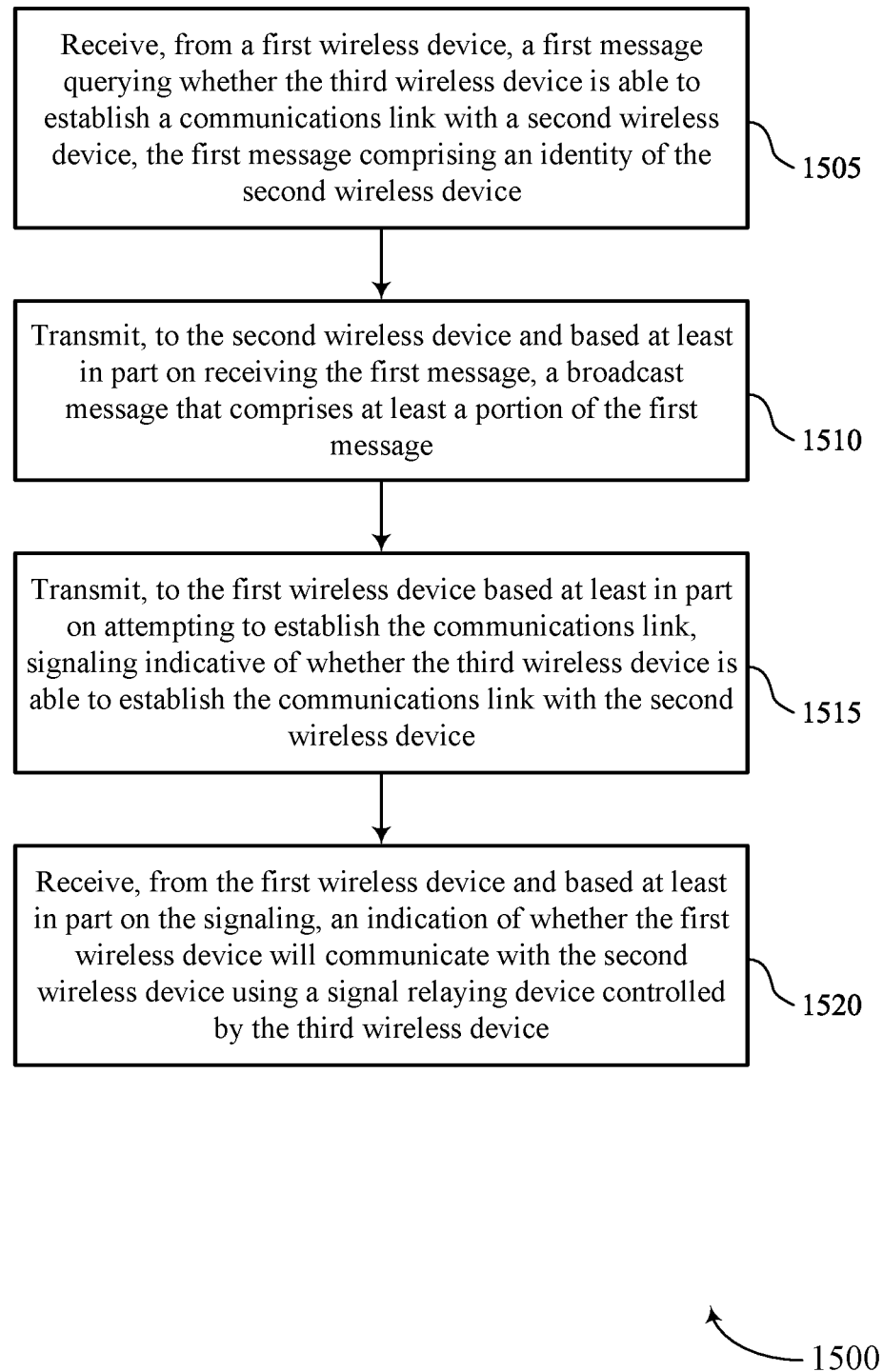

FIG. 15 shows a flowchart illustrating a method 1500 that supports signaling schemes for assisted communications between wireless devices in accordance with aspects of the present disclosure. The operations of the method 1500 may be implemented by a UE or a base station or its components as described herein. For example, the operations of the method 1500 may be performed by a UE 115 or a base station 105 as described with reference to FIGS. 1 through 8. In some examples, a UE or a base station may execute a set of instructions to control the functional elements of the UE or the base station to perform the described functions. Additionally or alternatively, the UE or the base station may perform aspects of the described functions using special-purpose hardware.

At 1505, the method may include receiving, from a first wireless device, a first message querying whether the third wireless device is able to establish a communications link with a second wireless device, the first message including an identity of the second wireless device. The operations of 1505 may be performed in accordance with examples as disclosed herein. In some examples, aspects of the operations of 1505 may be performed by a discovery assistance component 625 as described with reference to FIG. 6.

At 1510, the method may include transmitting, to the second wireless device and based on receiving the first message, a broadcast message that includes at least a portion of the first message. The operations of 1510 may be performed in accordance with examples as disclosed herein. In some examples, aspects of the operations of 1510 may be performed by a discovery assistance component 625 as described with reference to FIG. 6.

At 1515, the method may include transmitting, to the first wireless device based on attempting to establish the communications link, signaling indicative of whether the third wireless device is able to establish the communications link with the second wireless device. The operations of 1515 may be performed in accordance with examples as disclosed herein. In some examples, aspects of the operations of 1515 may be performed by a discovery assistance reply component 630 as described with reference to FIG. 6.

At 1520, the method may include receiving, from the first wireless device and based on the signaling, an indication of whether the first wireless device will communicate with the second wireless device using a signal relaying device controlled by the third wireless device. The operations of 1520 may be performed in accordance with examples as disclosed herein. In some examples, aspects of the operations of 1520 may be performed by an assisted link component 635 as described with reference to FIG. 6.

The following provides an overview of aspects of the present disclosure:

Aspect 1: A method for wireless communications at a first wireless device, comprising: transmitting, to a third wireless device associated with one or more signal relaying devices, a first message querying whether the third wireless device is able to establish a first communications link with a second wireless device, the first message comprising an identity of the second wireless device; receiving, from the third wireless device, signaling indicative of whether the third wireless device is able to establish the first communications link with the second wireless device; and communicating, based at least in part on the signaling indicating that the third wireless device is able to establish the first communications link, with the second wireless device via a second communications link using a signal relaying device of the one or more signal relaying devices associated with the third wireless device.

Aspect 2: The method of aspect 1, further comprising: attempting to communicate with the second wireless device over a direct communications link between the first wireless device and the second wireless device, wherein transmitting the first message to the third wireless device is based at least in part on failing to communicate with the second wireless device over the direct communications link.

Aspect 3: The method of any of aspects 1 and 2, further comprising: initiating a timer based at least in part on transmitting the first message; and determining that the third wireless device is able to establish the first communications link with the second wireless device based at least in part on receiving the signaling before an expiration of the timer.

Aspect 4: The method of aspect 3, wherein the first message indicates a value of the timer.

Aspect 5: The method of any of aspects 1 through 4, further comprising: determining to communicate with the second wireless device via the second communications link using the signal relaying device based at least in part on first measurement information associated with a first channel between the first wireless device and the third wireless device, second measurement information associated with a second channel between the third wireless device and the second wireless device, or any combination thereof.

Aspect 6: The method of any of aspects 1 through 5, further comprising: transmitting, to the third wireless device, a confirmation message indicating that the first wireless device will communicate with the second wireless device using the signal relaying device controlled by the third wireless device.

Aspect 7: The method of any of aspects 1 through 6, wherein the signaling indicative of whether the third wireless device is able to establish the first communications link with the second wireless device indicates a granted period for use of the signal relaying device by the first wireless device, the method further comprising: transmitting one or more signals to the signal relaying device during the granted period; and determining, based on least in part on transmitting the one or more signals to the signal relaying device during the granted period, one or more parameters for the communicating with the second wireless device via the second communications link using the signal relaying device.

Aspect 8: The method of any of aspects 1 through 7, further comprising: establishing a radio bearer between the first wireless device and the third wireless device before transmitting the first message, wherein transmitting the first message comprises: transmitting a RRC message that comprises the first message over the radio bearer between the first wireless device and the third wireless device.

Aspect 9: The method of any of aspects 1 through 7, wherein transmitting the first message comprises: transmitting a broadcast message that comprises the first message.

Aspect 10: The method of any of aspects 1 through 7, further comprising: performing, prior to transmitting the first message, a discovery procedure to detect the third wireless device.

Aspect 11: The method of any of aspects 1 through 10, further comprising: receiving, prior to transmitting the first message, a discovery signal from the second wireless device via the signal relaying device controlled by the third wireless device or a second signal relaying device controlled by a fourth wireless device different from the third wireless device.

Aspect 12: The method of any of aspects 1 through 11, wherein the first message further indicates a type of service requested by the first wireless device, a service requested by the first wireless device, a QoS threshold, a cell identifier associated with the first wireless device or the second wireless device, a group identifier associated with the first wireless device or the second wireless device, or any combination thereof.

Aspect 13: The method of any of aspects 1 through 12, wherein the signaling indicative of whether the third wireless device is able to establish the second communications link with the second wireless device indicates whether the third wireless device detected the second wireless device, an identifier of the second wireless device, identifiers of one or more third wireless devices different from the second wireless device detected by the third wireless device, one or more link quality measurements associated with the second wireless device, whether the second wireless device supports one or more types of services, a location of the second wireless device, a location of the second wireless device in relation to the third wireless device, a quantity of available configurations for the signal relaying device, or any combination thereof.

Aspect 14: The method of any of aspects 1 through 13, wherein the signal relaying device comprises a relay, a repeater, a RIS, a metasurface, or any combination thereof and the third wireless device comprises a controller for the signal relaying device.

Aspect 15: A method for wireless communications at a third wireless device, comprising: receiving, from a first wireless device, a first message querying whether the third wireless device is able to establish a communications link with a second wireless device, the first message comprising an identity of the second wireless device; transmitting, to the first wireless device based at least in part on attempting to establish the communications link, signaling indicative of whether the third wireless device is able to establish the communications link with the second wireless device; and receiving, from the first wireless device and based at least in part on the signaling, an indication of whether the first wireless device will communicate with the second wireless device using a signal relaying device controlled by the third wireless device.

Aspect 16: The method of aspect 15, further comprising: determining, based at least in part on receiving the first message, that the third wireless device is able to establish the communications link with the second wireless device; and transmitting, to the second wireless device, a second message indicating a type of service requested by the first wireless device, a service requested by the first wireless device, an application associated with the first wireless device, or any combination thereof.

Aspect 17: The method of aspect 16, further comprising: receiving, from the second wireless device, an indication of whether the second wireless device supports the type of service, the service, the application, or any combination thereof.

Aspect 18: The method of any of aspects 16 and 17, wherein determining that the third wireless device is able to establish the communications link with the second wireless device comprises: identifying that the communications link with the second wireless device was already established prior to receiving the first message; or establishing the communications link with the second wireless device after receiving the first message.

Aspect 19: The method of aspect 15, further comprising: monitoring for one or more synchronization signals from the second wireless device based at least in part on receiving the first message; and measuring the one or more synchronization signals to determine one or more link quality measurements associated with the one or more synchronization signals, wherein the signaling indicative of whether the third wireless device is able to establish the communications link with the second wireless device indicates the one or more link quality measurements.

Aspect 20: The method of aspect 15, further comprising: transmitting, to the second wireless device and based at least in part on receiving the first message, a broadcast message that comprises at least a portion of the first message.

Aspect 21: The method of aspect 20, wherein the broadcast message further comprises an indication of one or more resources for the second wireless device to use to establish the communications link.

Aspect 22: The method of any of aspects 15 through 21, wherein the signaling indicative of whether the third wireless device is able to establish the communications link with the second wireless device indicates a granted period for use of the signal relaying device by the first wireless device.

Aspect 23: The method of any of aspects 15 through 22, further comprising: establishing a radio bearer between the third wireless device and the first wireless device before receiving the first message, wherein receiving the first message comprises: receiving a RRC message that comprises the first message over the radio bearer between the first wireless device and the third wireless device.

Aspect 24: The method of any of aspects 15 through 22, wherein receiving the first message comprises: receiving a broadcast message that comprises the first message.

Aspect 25: The method of any of aspects 15 through 24, wherein the first message further indicates a type of service requested by the first wireless device, a service requested by the first wireless device, a QoS threshold, a cell identifier associated with the first wireless device or the second wireless device, a group identifier associated with the first wireless device or the second wireless device, or any combination thereof.

Aspect 26: The method of any of aspects 15 through 25, wherein the signaling indicative of whether the third wireless device is able to establish the communications link with the second wireless device indicates a value of a timer, whether the third wireless device has detected the second wireless device, an identifier of the second wireless device, identifiers of one or more additional wireless devices detected by the third wireless device and different from the second wireless device, link quality measurements associated with the second wireless device, an indication of whether the second wireless device supports one or more types of services, a location of the second wireless device, a location of the second wireless device relative to the third wireless device, a quantity of available configurations for the signal relaying device, or any combination thereof.

Aspect 27: The method of any of aspects 15 through 26, wherein the signal relaying device comprises a relay, a repeater, a RIS, a metasurface, or any combination thereof and the third wireless device comprises a controller for the signal relaying device.

Aspect 28: An apparatus for wireless communications at a first wireless device, comprising a processor; memory coupled with the processor; and instructions stored in the memory and executable by the processor to cause the apparatus to perform a method of any of aspects 1 through 14.

Aspect 29: An apparatus for wireless communications at a first wireless device, comprising at least one means for performing a method of any of aspects 1 through 14.

Aspect 30: A non-transitory computer-readable medium storing code for wireless communications at a first wireless device, the code comprising instructions executable by a processor to perform a method of any of aspects 1 through 14.

Aspect 31: An apparatus for wireless communications at a third wireless device, comprising a processor; memory coupled with the processor; and instructions stored in the memory and executable by the processor to cause the apparatus to perform a method of any of aspects 15 through 27.

Aspect 32: An apparatus for wireless communications at a third wireless device, comprising at least one means for performing a method of any of aspects 15 through 27.

Aspect 33: A non-transitory computer-readable medium storing code for wireless communications at a third wireless device, the code comprising instructions executable by a processor to perform a method of any of aspects 15 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shall be construed in the same manner as "one or more."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first wireless device for wireless communication, comprising:
at least one memory; and
at least one processor coupled to the at least one memory, wherein the at least one processor is configured to cause the first wireless device to:
transmit, to an assisting node controlling a plurality of signal relaying devices, a first message querying whether the assisting node is able to establish a first communications link with a second wireless device, the first message comprising an identity of the second wireless device;
receive, from the assisting node, signaling indicative of whether the assisting node is able to establish the first communications link with the second wireless device;
select the assisting node based on the signaling indicative of whether the assisting node is able to establish the first communications link with the second wireless device;
transmit, based on the signaling indicating that the assisting node is able to establish the first communications link, a plurality of discovery messages to the second wireless device via the plurality of signal relaying devices controlled by the selected assisting node, wherein each discovery message of the plurality of discovery messages is transmitted according to a respective signal relay device configuration of a plurality of signal relay device configurations;
select a signal relaying device from the plurality of signal relaying devices controlled by the selected assisting node and a signal relay device configuration from the plurality of signal relay device configurations for communication with the second wireless device based on the plurality of discovery messages; and
communicate with the second wireless device via a second communications link using the selected signal relaying device and according to the selected signal relay device configuration.

2. The first wireless device of claim 1, wherein the at least one processor is further configured to cause the first wireless device to:
attempt to communicate with the second wireless device over a direct communications link between the first wireless device and the second wireless device, wherein the at least one processor is configured to transmit the first message to the assisting node based at least in part on failing to communicate with the second wireless device over the direct communications link.

3. The first wireless device of claim 1, wherein the at least one processor is further configured to cause the first wireless device to:
   initiate a timer based at least in part on transmitting the first message; and
   determine that the assisting node is able to establish the first communications link with the second wireless device based at least in part on receiving the signaling before an expiration of the timer.

4. The first wireless device of claim 3, wherein the first message indicates a value of the timer.

5. The first wireless device of claim 1, wherein the at least one processor further configured to cause the first wireless device to:
   determine to communicate with the second wireless device via the second communications link using the selected signal relaying device based at least in part on first measurement information associated with a first channel between the first wireless device and the assisting node, second measurement information associated with a second channel between the assisting node and the second wireless device, or any combination thereof.

6. The first wireless device of claim 1, wherein the at least one processor is further configured to cause the first wireless device to:
   transmit, to the assisting node, a confirmation message indicating that the first wireless device will communicate with the second wireless device using the selected signal relaying device controlled by the assisting node.

7. The first wireless device of claim 1, wherein the signaling indicative of whether the assisting node is able to establish the first communications link with the second wireless device indicates a granted period for use of the plurality of signal relaying devices by the first wireless device, and wherein the at least one processor is further configured to cause the first wireless device to:
   transmit the plurality of discovery messages during the granted period.

8. The first wireless device of claim 1, wherein the at least one processor is further configured to cause the first wireless device to:
   establish a radio bearer between the first wireless device and the assisting node before transmitting the first message, wherein, to transmit the first message, the at least one processor is configured to cause the first wireless device to:
      transmit a radio resource control message that comprises the first message over the radio bearer between the first wireless device and the assisting node.

9. The first wireless device of claim 1, wherein, to transmit the first message, the at least one processor is configured to cause the first wireless device to:
   transmit a broadcast message that comprises the first message.

10. The first wireless device of claim 1, wherein the at least one processor is further configured to cause the first wireless device to:
    perform, prior to transmitting the first message, a discovery procedure to detect the assisting node.

11. The first wireless device of claim 1, wherein the at least one processor is further configured to cause the first wireless device to:
    receive, prior to transmitting the first message, a discovery signal from the second wireless device via one of the plurality of signal relaying devices controlled by the assisting node or a second signal relaying device controlled by a fourth wireless device different from the assisting node.

12. The first wireless device of claim 1, wherein the first message further indicates a type of service requested by the first wireless device, a service requested by the first wireless device, a quality of service threshold, a cell identifier associated with the first wireless device or the second wireless device, a group identifier associated with the first wireless device or the second wireless device, or any combination thereof.

13. The first wireless device of claim 1, wherein the signaling indicative of whether the assisting node is able to establish the second communications link with the second wireless device indicates whether the assisting node detected the second wireless device, an identifier of the second wireless device, one or more identifiers of one or more assisting nodes different from the second wireless device detected by the assisting node, one or more link quality measurements associated with the second wireless device, whether the second wireless device supports one or more types of services, a location of the second wireless device, a location of the second wireless device in relation to the assisting node, a quantity of available configurations for the signal relaying device, or any combination thereof.

14. The first wireless device of claim 1, wherein the signal relaying device comprises a relay, a repeater, a reconfigurable intelligent surface, a metasurface, or any combination thereof, and the assisting node comprises a controller for the signal relaying device.

15. An assisting node for wireless communication, comprising:
    at least one memory; and
    at least one processor coupled to the at least one memory, wherein the at least one processor is configured to cause the assisting node to:
       receive, from a first wireless device, a first message querying whether the assisting node is able to establish a communications link with a second wireless device, the first message comprising an identity of the second wireless device;
       transmit, to the first wireless device based at least in part on attempting to establish the communications link, signaling indicative of whether the assisting node is able to establish the communications link with the second wireless device;
       receive, from the first wireless device and based at least in part on the signaling, an indication that the first wireless device selected the assisting node to communicate with the second wireless device;
       transmit, based on the signaling indicating that the first wireless device selected the assisting node to communicate with the second wireless device, a plurality of discovery messages received from the first wireless device to the second wireless device via a plurality of signal relaying devices controlled by the selected assisting node, wherein each discovery message of the plurality of discovery messages is associated with a respective signal relay device configuration of a plurality of signal relay device configurations; and
       transmit a data message received from the first wireless device to the second wireless device using a signal relaying device of a plurality of signal relaying device controlled by the selected assisting node and a signal relay device configuration of the plurality of signal relay device configurations, wherein the signal relaying device and the signal relay device configuration are selected based on the plurality of discovery messages.

16. The assisting node of claim 15, wherein the at least one processor is further configured to cause the assisting node to:
determine, based at least in part on receiving the first message, that the assisting node is able to establish the communications link with the second wireless device; and
transmit, to the second wireless device, a second message indicating a type of service requested by the first wireless device, a service requested by the first wireless device, an application associated with the first wireless device, or any combination thereof.

17. The assisting node of claim 16, wherein the at least one processor is further configured to cause the assisting node to:
receive, from the second wireless device, an indication of whether the second wireless device supports the type of service, the service, the application, or any combination thereof.

18. The assisting node of claim 16, wherein, to determine that the assisting node is able to establish the communications link with the second wireless device, the at least one processor is configured to cause the assisting node to:
identify that the communications link with the second wireless device was already established prior to receiving the first message; or
establish the communications link with the second wireless device after receiving the first message.

19. The assisting node of claim 15, wherein the at least one processor is further configured to cause the assisting node to:
monitor for one or more synchronization signals from the second wireless device based at least in part on receiving the first message; and
measure the one or more synchronization signals to determine one or more link quality measurements associated with the one or more synchronization signals, wherein the signaling indicative of whether the assisting node is able to establish the communications link with the second wireless device indicates the one or more link quality measurements.

20. The assisting node of claim 15, wherein the at least one processor is further configured to cause the assisting node to:
transmit, to the second wireless device and based at least in part on receiving the first message, a broadcast message that comprises at least a portion of the first message.

21. The assisting node of claim 20, wherein the broadcast message further comprises an indication of one or more resources for the second wireless device to use to establish the communications link.

22. The assisting node of claim 15, wherein the signaling indicative of whether the assisting node is able to establish the communications link with the second wireless device indicates a granted period for use of the plurality of signal relaying devices by the first wireless device.

23. The assisting node of claim 15, wherein the at least one processor is further configured to cause the assisting node to:
establish a radio bearer between the assisting node and the first wireless device before receiving the first message, wherein, to receive the first message, the at least one processor is configured to cause the assisting node to:
receive a radio resource control message that comprises the first message over the radio bearer between the first wireless device and the assisting node.

24. The assisting node of claim 15, wherein, to receive the first message, the at least one processor is configured to cause the assisting node to:
receive a broadcast message that comprises the first message.

25. The assisting node of claim 15, wherein the first message further indicates a type of service requested by the first wireless device, a service requested by the first wireless device, a quality of service threshold, a cell identifier associated with the first wireless device or the second wireless device, a group identifier associated with the first wireless device or the second wireless device, or any combination thereof.

26. The assisting node of claim 15, wherein the signaling indicative of whether the assisting node is able to establish the communications link with the second wireless device indicates a value of a timer, whether the assisting node has detected the second wireless device, an identifier of the second wireless device, one or more identifiers of one or more additional wireless devices detected by the assisting node and different from the second wireless device, one or more link quality measurements associated with the second wireless device, whether the second wireless device supports one or more types of services, a location of the second wireless device, a location of the second wireless device relative to the assisting node, a quantity of available configurations for the signal relaying device, or any combination thereof.

27. The assisting node of claim 15, wherein the signal relaying device comprises a relay, a repeater, a reconfigurable intelligent surface, a metasurface, or any combination thereof, and the assisting node comprises a controller for the signal relaying device.

28. A method for wireless communications at a first wireless device, comprising:
transmitting, to an assisting node controlling a plurality of signal relaying devices, a first message querying whether the assisting node is able to establish a first communications link with a second wireless device, the first message comprising an identity of the second wireless device;
receiving, from the assisting node, signaling indicative of whether the assisting node is able to establish the first communications link with the second wireless device;
selecting the assisting node based on the signaling indicative of whether the assisting node is able to establish the first communications link with the second wireless device;
transmitting, based on the signaling indicating that the assisting node is able to establish the first communications link, a plurality of discovery messages to the second wireless device via the plurality of signal relaying devices controlled by assisting node, wherein each discovery message of the plurality of discovery messages is transmitted according to a respective signal relay device configuration of a plurality of signal relay device configurations;
selecting a signal relaying device from the plurality of signal relaying devices controlled by the selected assisting node and a signal relay device configuration from the plurality of signal relay device configurations for communication with the second wireless device based on the plurality of discovery messages; and communicating with the second wireless device via a second communications link using the selected signal relaying device and according to the selected signal relay device configuration.

29. The method of claim 28, further comprising:
determining to communicate with the second wireless device via the second communications link using the signal relaying device based at least in part on first measurement information associated with a first channel between the first wireless device and the assisting node, second measurement information associated with a second channel between the assisting node and the second wireless device, or any combination thereof.

30. A method for wireless communications at an assisting node, comprising:
receiving, from a first wireless device, a first message querying whether the assisting node is able to establish a communications link with a second wireless device, the first message comprising an identity of the second wireless device;
transmitting, to the first wireless device based at least in part on attempting to establish the communications link, signaling indicative of whether the assisting node is able to establish the communications link with the second wireless device;
receiving, from the first wireless device and based at least in part on the signaling, an indication that the first wireless device selected the assisting node to communicate with the second wireless device;
transmitting, based on the signaling indicating that the first wireless device selected the assisting node to communicate with the second wireless device, a plurality of discovery messages received from the first wireless device to the second wireless device via a plurality of signal relaying devices controlled by the selected assisting node, wherein each discovery message of the plurality of discovery messages is associated with a respective signal relay device configuration of a plurality of signal relay device configurations; and
transmitting a data message received from the first wireless device to the second wireless device using a signal relaying device of a plurality of signal relaying device controlled by the selected assisting node and a signal relay device configuration of the plurality of signal relay device configurations, wherein the signal relaying device and the signal relay device configuration are selected based on the plurality of discovery messages.

* * * * *